(12) United States Patent
Holladay et al.

(10) Patent No.: US 9,191,721 B2
(45) Date of Patent: Nov. 17, 2015

(54) NETWORKED AUDIO/VIDEO SYSTEM

(75) Inventors: Adam Holladay, Salt Lake City, UT (US); Richard A. Kreifeldt, Sandy, UT (US); Gregory Matthew Nelson, South Jordan, UT (US); Spencer Warren George, West Lehi, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 901 days.

(21) Appl. No.: 12/816,255

(22) Filed: Jun. 15, 2010

(65) Prior Publication Data
US 2010/0318917 A1  Dec. 16, 2010

Related U.S. Application Data

(60) Provisional application No. 61/187,487, filed on Jun. 16, 2009.

(51) Int. Cl.
*H04R 3/12* (2006.01)
*H04L 12/24* (2006.01)
(Continued)

(52) U.S. Cl.
CPC .......... *H04N 21/485* (2013.01); *H04L 41/0803* (2013.01); *H04L 41/0893* (2013.01); *H04N 21/43615* (2013.01); *G06F 3/165* (2013.01); *H04R 3/12* (2013.01); *H04R 2227/005* (2013.01)

(58) Field of Classification Search
CPC ............... H04R 2227/005; H04R 3/12; H04L 2012/2849; H04L 12/2805; H04L 29/06476; H04L 41/0803; H04L 41/0893; G06F 3/165
USPC .................... 715/717, 734, 716, 735; 725/78; 709/220
See application file for complete search history.

(56) References Cited

U.S. PATENT DOCUMENTS 4,866,606 A * 9/1989 Kopetz .......................... 713/375
6,480,889 B1 * 11/2002 Saito et al. ..................... 709/220
(Continued)

FOREIGN PATENT DOCUMENTS

WO   WO 2006066351 A2 * 6/2006
WO   WO 2009086599 A1 * 7/2009 .............. G06F 3/048

OTHER PUBLICATIONS

Microsoft Computer Dictionary, Microsoft Press, Mar. 15, 2002.*
(Continued)

*Primary Examiner* — Nicholas Ulrich
(74) *Attorney, Agent, or Firm* — Alleman Hall McCoy Russell & Tuttle LLP

(57) ABSTRACT

A system for configuring an audio/video (AV) system includes a computing device having a processor to enable a user, with a user interface of the computing device, to configure the AV system. The processor may enable the user to draw output zones to create a representation of a geographical layout of a venue in which the AV system is located. The processor may enable the user to place transmitting and receiving AV devices within the output zones that substantially represent physical locations thereof within the venue. The processor may enable the user to logically associate receiving AV device channels of one or more receiving AV devices within an output zone. The processor may also enable the user to select which of a number of source AV signals from transmitting AV devices the user wants to route to the associated output zone. The processor routes the source AV signals from one or more transmitting AV devices over a network to the one or more receiving AV device channels, such that the one or more receiving AV device channels are processed according to the output zone as configured by the user in the user interface.

38 Claims, 18 Drawing Sheets

(51) Int. Cl.
*H04N 21/485* (2011.01)
*G06F 3/16* (2006.01)
*H04N 21/436* (2011.01)

(56) References Cited

U.S. PATENT DOCUMENTS

| | | | |
|---|---|---|---|
| 6,834,374 B1* | 12/2004 | Sameshima | 715/736 |
| 6,907,458 B2* | 6/2005 | Tomassetti et al. | 709/223 |
| 7,237,015 B1* | 6/2007 | Ochiai et al. | 709/223 |
| 7,333,478 B2* | 2/2008 | Wiebe | 370/352 |
| 7,631,119 B2* | 12/2009 | Moore et al. | 710/52 |
| 8,078,298 B2* | 12/2011 | Kreifeldt et al. | 700/94 |
| 8,171,152 B2* | 5/2012 | White et al. | 709/231 |
| 2001/0052995 A1* | 12/2001 | Idehara | 358/1.15 |
| 2002/0072816 A1* | 6/2002 | Shdema et al. | 700/94 |
| 2002/0124097 A1* | 9/2002 | Isely et al. | 709/231 |
| 2003/0200001 A1* | 10/2003 | Goddard | 700/94 |
| 2004/0068588 A1* | 4/2004 | Kowalski et al. | 709/248 |
| 2005/0034006 A1* | 2/2005 | Schoenfeld et al. | 713/401 |
| 2005/0232602 A1* | 10/2005 | Kreifeldt et al. | 386/96 |
| 2005/0239396 A1* | 10/2005 | Kreifeldt et al. | 455/3.01 |
| 2005/0239397 A1* | 10/2005 | Kreifeldt et al. | 455/3.01 |
| 2006/0156375 A1* | 7/2006 | Konetski | 725/135 |
| 2006/0248173 A1* | 11/2006 | Shimizu | 709/220 |
| 2007/0043847 A1* | 2/2007 | Carter et al. | 709/223 |
| 2007/0044025 A1* | 2/2007 | Sakamoto | 715/734 |
| 2007/0142022 A1* | 6/2007 | Madonna et al. | 455/352 |
| 2007/0160224 A1* | 7/2007 | Nathan | 381/77 |
| 2008/0127063 A1* | 5/2008 | Silva et al. | 717/107 |
| 2008/0239887 A1* | 10/2008 | Tooker et al. | 369/30.06 |
| 2008/0260127 A1* | 10/2008 | Weidig | 379/159 |
| 2009/0073316 A1* | 3/2009 | Ejima | 348/515 |
| 2009/0225790 A1* | 9/2009 | Shay et al. | 370/503 |
| 2009/0313659 A1* | 12/2009 | Samuels | 725/78 |
| 2010/0008512 A1* | 1/2010 | Packer et al. | 381/57 |
| 2010/0118873 A1* | 5/2010 | Nakayama et al. | 370/389 |
| 2010/0290486 A1* | 11/2010 | Gurdan et al. | 370/503 |
| 2010/0292818 A1* | 11/2010 | Ramsay | 700/94 |
| 2010/0299639 A1* | 11/2010 | Ramsay et al. | 715/835 |

OTHER PUBLICATIONS

"Room Combine," Mar. 27, 2008, retrieved Apr. 30, 2010, from local storage (15 pages).

* cited by examiner

NETWORKED AUDIO/VIDEO SYSTEM

PRIORITY CLAIM

This application claims the benefit of priority from U.S. Provisional Application No. 61/187,487, filed Jun. 16, 2009, which is incorporated herein by reference.

BACKGROUND OF THE INVENTION

1. Technical Field

The present disclosure relates generally to audio and video systems and, in particular, to the automated routing of networked audio/video (AV) to AV devices associated with an output zone.

2. Related Art

The term "audio/video" (AV) as used herein refers to just audio, just video, or a combination of audio and video. Audio/video software tools are typically device-centric and are located within a particular device. Audio/video software tools provide a system designer with access to an extensive array of properties with which to individually and independently configure a particular device. Any number of devices may be implemented as part of an AV system. Within the AV system, in order to alter the configuration of the system, or parts of the system, an operator may need to access a large number of devices or successively examine a large number of devices in order to locate just those devices that are to be reconfigured to accomplish a particular task. Therefore, the system designer may spend a considerable amount of time independently configuring each of the devices in the AV system when initially setting up the system or modifying the system. Due to the devices in the system being distributed throughout a building, or other geographical area, the operator may also have difficulty locating and reconfiguring the particular devices to accomplish a particular task.

For example, the following tasks may therefore be complicated and/or time-consuming to achieve: (1) adding and organizing devices; (2) addressing devices; (3) grouping of devices for control; (4) system-wide routing of networked audio and/or video; (5) access control configuration; (6) speaker/system tuning; (7) room combining; (8) creation of custom control interfaces or panels; (9) system troubleshooting; and (10) tracing signal paths. Other tasks may also be complicated and/or time-consuming.

SUMMARY

A system is provided that addresses one or more of the following issues: (1) identification of a subset of parameters among available device parameters that may be more likely to be modified during operation of the system; (2) facilitate logical groupings of devices that may or may not map to physical groupings of the devices; (3) control of the behavior of logical groupings of devices instead of or in addition to the behavior of the devices individually; and (4) recognizing that the system designer may prefer to consider processing and control more abstracted from the individual devices, and therefore more globally on a system basis.

The system may include AV-related devices on a network. The system may include a unifying control protocol to control the devices in the system. The system may include a unifying networked audio/video (AV) protocol to transmit and/or receive AV signals. The system may execute a configuration software application that may configure and/or discover the AV-related devices in the system. The system may facilitate AV-related device routing and control based on groups, otherwise referred to as output zones.

During operation of the system, a system designer or any other user may pictorially configure an AV system of AV-related devices through a user interface of the configuration system. A computing device running the system may then automatically complete the AV system configuration, seamlessly and without intricate design steps required on the part of the user.

For instance, the user, through the user interface, may design a building with output zones including rooms, a rack, common areas, or other discrete geographical area desired for grouping AV devices that may serve a common purpose. The user may then, again through the user interface, place a number of transmitting and receiving AV devices within the output zones of the geographical layout that substantially represent physical locations thereof within the venue. Transmitting AV devices—also referred to as source AV devices—are devices that transmit a source AV signal. Receiving AV devices—also referred to as destination AV devices—are devices that receive that source AV signal. As such, some intermediate AV devices such as a mixer may be both a transmitting AV device and a receiving AV device because the mixer receives and transmits (directs) an AV signal along various AV paths.

Further by way of example, an amplifier, a number of loudspeakers, and perhaps a TV monitor (receiving devices) may be placed in a classroom and a DVD player and one or more digital control processors (DSPs) (transmitting devices) may be placed in a rack room. The user may then logically associate one or more receiving AV device channels of the receiving AV devices with an output zone that replicates a physical relationship of at least some of the receiving AV devices with other AV devices, such as loudspeakers, in the output zone. A logical association with an output zone may include an instruction to the system to logically replicate how the output of a receiving AV device—which may be physically located in one zone—is seen and/or heard in a second zone. For example, the output of an amplifier located in a rack room may be associated with the loudspeakers it powers in a separate output zone. The user may also select which of a number of source AV signals the user wants to route to the associated output zone.

In one example, the system may then automatically route the source AV signals from one or more transmitting AV devices over the network to the one or more receiving AV devices associated with the output zone, such that the one or more receiving AV device channels are processed according to the output zone as pictorially configured by the user. The system may route output signals generated by AV-related devices on the network to a group of AV-related devices (grouped by their association with an output zone) by associating the output signals with the output zone. The system may determine a suitable route based on the physical and logical groups.

In another example, the system may automatically assign parameters to a control interface such as a control panel or wall controller for user control of one or more parameters of one or more AV devices. The one or more AV devices may be taken under grouped control from the interface in a manner derived from their logical association of their output channels with associated output zones. The system may identify the controllable parameters associated with the associated AV devices, and then assign a network control protocol data storage structure associated with each respective controllable parameter to the control interface. The system may then launch the control interface in an application window having integrated therewith the controllable parameters and a menu selection of a source AV signal. The system may send the assignment of each data storage structure and associated controllable parameter to each respective corresponding AV device over the network to remotely control the one or more AV devices with the control interface. The system may further enable the user to select a source AV signal for routing to the output zone. This is all automated as the control interface is seamlessly created by the computing device running the configuration system.

The system may, accordingly, control configuration of AV-related devices as per output zone. For example, a volume control on a user interface panel that is associated with a logical group may control the volume parameter in the AV-related devices in the associated output zone. In another example, equalization parameters or any other operational parameters for output zones of AV-related devices may be configured or reconfigured as a group based on the logical grouping of the AV devices by physical output zone.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
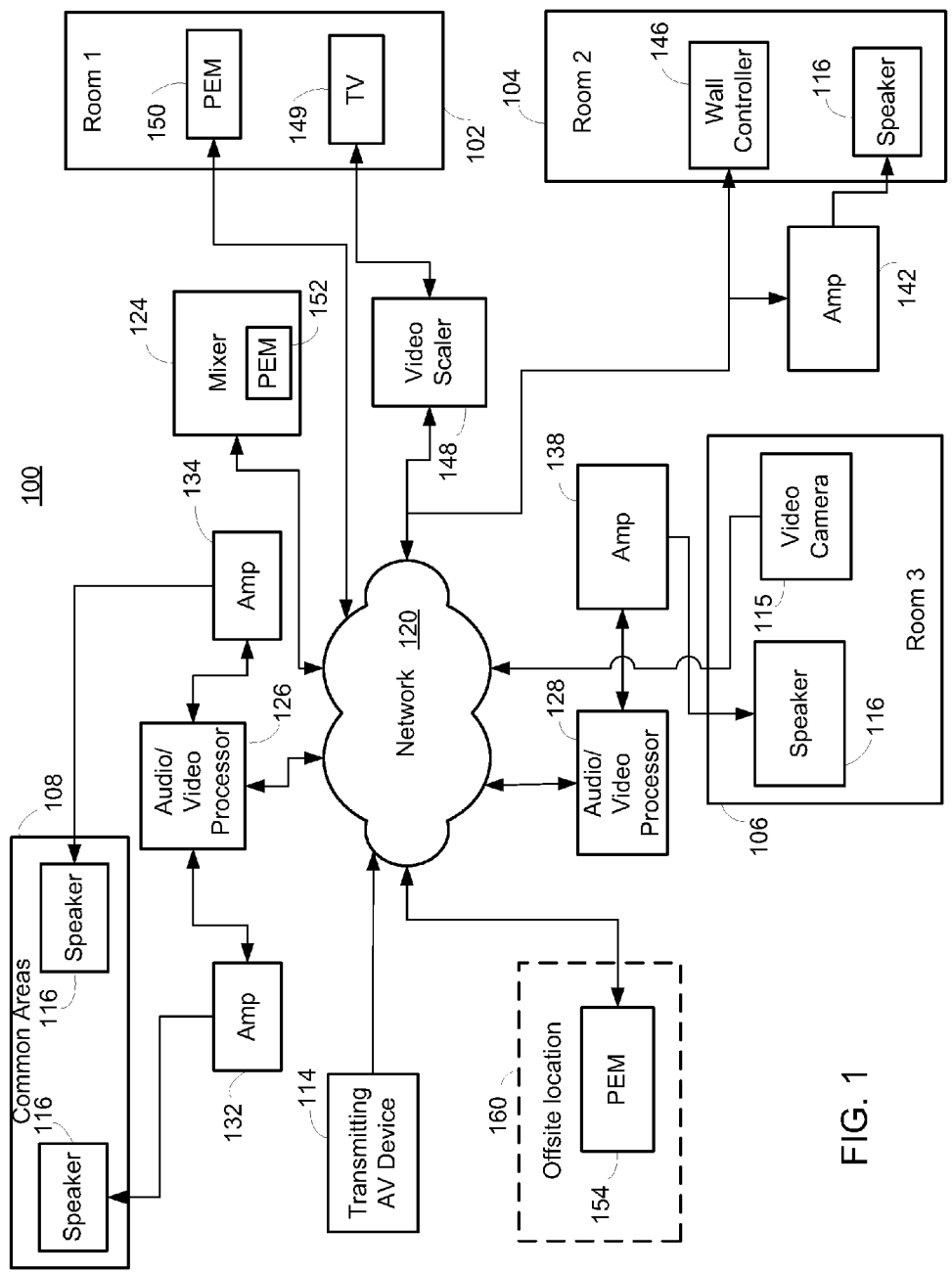
FIG. 1 is a block diagram of an example of an audio/video (AV) system.

By way of introduction, the present disclosure relates to enabling a user to, through a user interface of a computing device that is running a configuration system, pictorially configure an audio/video (AV) system before the system may be physically configured over a network based on such pictorial, logical configuration. The computing device or other computer, therefore, may automatically complete the AV system configuration seamlessly and without intricate, manual programming required on the part of the user after it has been pictorially and logically configured by the user.

For instance, the user may draw output zones such as rooms in a building where transmitting and receiving AV devices can be placed where they physically belong in those output zones. Output zones may include a combination of rooms of a building. Transmitting (or source) AV devices are devices that transmit a source AV signal while receiving (or destination) AV devices are devices that receive that source AV signal. A source AV signal may be an audio signal, a video signal, or a combination of an audio and a video signal sent individually or together. Examples of a source device may include an amplifier, a microphone, a CD player, a DVD player, and any digital signal processing (DSP) devices connected to the former. Examples of a receiving device may include an amplifier, a loudspeaker, and a DSP device connected to the amplifier. The user interface also may allow the user to logically associate one or more receiving AV device channels of one or more receiving AV devices with an output zone that is the same as or different from the output zone in which the one or more receiving AV devices are physically located. The user interface may also enable the user to select which of a number of source AV signals the user wants to route to the associated output zone.

The computing device associated with the user interface may communicate with the source and destination devices over a network. Accordingly, once the user has pictorially and logically configured the AV system within the user interface, the computing device may automatically route the source AV signals from one or more transmitting AV devices over the network to the one or more receiving AV devices associated with the output zone, such that operation of the one or more receiving AV devices is driven according to the output zone as configured by the user through the user interface.

Furthermore, the computing device may automatically assign parameters of one or more AV devices associated with an output zone to a control interface for user control. More specifically, the computing device may identify one or more controllable parameters associated with the one or more AV devices associated with the output zone; assign a network control protocol data storage structure associated with each respective parameter to the control interface; and launch the control interface for specific control of the output zone(s) in an application window having integrated therewith the controllable parameters and a menu selection of a source AV signal. The system may send the assigned data storage structure and associated parameter to each corresponding AV device over a network to thereby control the one or more AV devices with the control interface over the network. The system may also enable a user to select a source AV signal to route to output zone(s).

A system for management and control of AV-related equipment is provided as a network infrastructure. The system is an architecture that provides the capability to manage, monitor, and control all of the AV-related equipment in an AV system. Accordingly, everything from video projectors, to video scalers, to microphones, to amplifiers, to mixers, to lighting systems is accessible and controllable with the system.

The system provides a network independent protocol to seamlessly integrate across a plurality of different AV-related devices of varying complexity using any of a variety of physical networks and communication platforms. In addition, the system allows for upgrades, changes and additions of AV-related devices within the system without additional software programming by providing messaging functionality to discover those aspects of a particular AV-related device that are not already known. The messaging functionality also allows AV data and related information to be transmitted between selected, AV-related devices efficiently and with minimized network traffic.

One or more performance equipment managers ("PEM") are included in the system and may be executed by a computer or other computing device. The PEM(s) can be located in an AV device, for instance in local memory or as a standalone processor, or located externally to the AV device in another AV device of the network or in a separate computing device. The PEM(s) retrieve and/or generate control interface views of the entire AV system. In addition, the PEM(s) may retrieve and/or generate control interface views for each specific device within the AV system. The control interface views allow the coordinated management, control, and monitoring of the AV-related devices within the AV system. A communication protocol used within the system allows standardized communication between the PEM(s) and the AV-related devices, as well as device-to-device communication.

The system also provides for discovery of the functionality of the AV-related devices included in the AV system. The PEM may include a graphical user interface ("GUI") core and a plurality of plugins. The GUI core may receive a plurality of class attributes from an AV-related device. The class attributes may be analyzed by the plugins to determine if any one of the plugins is associated with the AV-related device. A plugin that is identified as associated with an AV-related device may receive an AV node structure from the AV-related device. The AV node structure may be representative of at least a portion of the functionality of the AV-related device. Other plugins may be queried for portions of the AV node structure that are unknown by the plugin associated with the AV-related device. In addition, further discovery of the functionality of the AV-related device may be performed if portions of the AV node structure are unknown by the plugin associated with the AV-related device and the other plugins. In addition, AV-related devices may be discovered automatically by the PEM even when previously unknown.

The amount of the AV node structure obtained from an AV-related device also may be desirably limited based on the operational capability of the device on which the PEM is operated. When the processing power, display capability, input/output, network bandwidth, etc., of the device on which the PEM is operating is relatively limited, a relatively small portion of the AV node structure may be obtained and processed. Conversely, when the PEM is operated on a device with a substantial amount of operational capability, the entire node structure may be obtained and processed.

A product plugin that corresponds to an AV-related device may include stored predefined control interface (or panel) views. The stored predefined control interface views may be identified using an AV node structure of the AV-related device that is received by the product plugin from the AV-related device. The AV node structure includes components that are representative of the functionality of the AV-related device. Based on the components included in the AV node structure, the product plugin may retrieve predefined control interface views from a control interface library included in the product plugin. The product plugin also includes a node instantiation engine that is configured to instantiate the predefined control interface views that correspond to the components. The node instantiation engine can determine if the components are fully supported with the control interface views. If all of the components are not represented with the predefined control interface views, the instantiation engine can integrate one or more user interface aspects into one or more of the control interface views prior to instantiation. The aspects that are integrated may be predefined user interface aspects that are stored in the product plugin, or in another product plugin. In addition, the aspects may be generic user interface aspects that are generated by the generic plugin. Once completed, the control interface views can be instantiated for display and then stored.

The generic plugin may also be used for AV-related devices that do not have a corresponding product plugin. In these situations, the generic plugin may automatically develop a generic control interface view based on the AV node structure provided by the AV-related device. Within the generic control interface view, one or more stored, predefined user interface aspects may be obtained from the product plugin(s) and integrated into the generic control interface view. In addition, the generic control interface view may generate one or more generic user interface aspects to include in the generic control interface view. Once formed, the generic control interface view can be instantiated for display and then stored.

The PEM can also instantiate the stored, predefined control interface views and/or the generic control interface views with a sliding level of complexity based on the operational capabilities of the displaying device. The quantity of control interface views instantiated and the level of complexity of each of the instantiated control interface views may be automatically adjusted by the PEM based on the processing capabilities and/or the display capabilities of the displaying device.

The GUI used to control the AV related devices may switch between a venue view and a product view. In the venue view, the GUI of the control interface view may allow a user to view multiple devices in an AV system at the same time. In the product view, the GUI of the control interface view for a single device may be displayed. A user may be able to switch between these views as needed.

The standardized protocol also allows a user to add an AV-related component to an AV system without performing any setup. Even though the physical communication link may be different for each AV-related device in the system in some examples, the protocol allows each type of communication platform to seamlessly communicate. This greatly reduces the time for setting up the AV system, which may be particularly important for systems that are repeatedly disassembled and re-assembled.

A common packet structure may be used in the protocol. In the packet structure, a source address and destination address may be used in the packet to route the message to the appropriate AV-related device. The source address and destination address may be a unique node ID associated with an AV-related device. The node ID may be an independent identification of the AV-related device that is independent of network special addressing used in conjunction with the AV-related device's network interface such as TCP/IP, for instance. This enables messages between AV-related devices that have different network special protocols and network interfaces, for example. Accordingly, operation of the network protocol transcends and is independent of such network special protocols.

To facilitate messaging between AV-related devices, each of the AV-related devices is assigned a unique node ID. The node ID may be assigned in a sequential manner as each AV-related device powers up. For example, a power sequencer may allow users to sequentially power up AV-related devices. The sequential assignment of node IDs for the AV-related devices reduces network traffic and prevents conflicting addresses on the network. In some examples, AV-related devices may be connected using a switch. The assignment of a node ID in such examples may be accomplished using an association between a node ID and port on the switch. Accordingly, a user may assign a node ID to an AV-related device by simply plugging the AV-related device into a port on the switch.

The system may also include a method for discovery of AV-related devices on an AV network. The automatic discovery of other AV-related devices allows a greater level of interaction between AV-related devices. In some examples, an AV-related device may act as a proxy to transmit information regarding other AV-related devices behind a switch. In other examples, the AV-related devices may use a virtual private network to discover other AV-related devices.

In some examples, a PEM may be located geographically remote from the AV-related devices. For example, the PEM may manage AV-related devices over the Internet. Accordingly, error logging, alarming and system operation may be monitored to provide troubleshooting from a remote location.

The PEMs may identify the functionality of AV-related devices in the system using an AV node structure provided by the AV-related device. The AV node structure describes the functionality and includes components that describe changeable parameters in a respective AV-related device. The PEM can subscribe to the changeable parameters of an AV-related device using the components of the AV node structure. Subscriptions may be made with a subscribe message that identifies the component(s) in the AV node structure that is desired to be received. The subscribe message may also identify a predetermined condition that triggers transmittal of the value of the component.

Subscriptions may also occur between AV-related devices. The subscribe message may map one or more component(s) in the AV node structure of a subscribee AV-related device to a component in the AV node structure of a subscriber AV-related device. Accordingly, when a predetermined condition occurs, the subscribee AV-related device may automatically set the component in the subscriber AV-related device to the value of the component in the subscribee AV-related device.

The components of the AV node structure may be configured in a three tier hierarchical structure that includes virtual devices, objects, and state variables. The changeable parameters that are provided in response to a subscription may be the actual values of state variables of the subscribee. The components in the subscriber AV-related device that are set by the subscribee may also be changeable parameters (state variables) that are locations where the value provided by the subscribee may be stored.

When virtual devices or objects are identified in a subscription message, subscriptions to all of the changeable parameters included in the identified virtual devices or objects may be subscribed to. The subscribee AV-related device may create and maintain a list of subscribers to each of the components included in the AV node structure of the subscribee. The list may also identify the state variables in the subscriber AV-related device that are to be set by the subscribee on the occurrence of a predetermined condition. The subscriptions allow standardized communication between the PEMs and the AV-related devices, as well as device-to-device communication to continually and efficiently update and maintain changeable parameters in different devices.

FIG. 1 is a block diagram of an example of an audio/video (AV) system 100 having a plurality of AV-related devices configured for a permanently-installed sound system, such as in an amusement park, although the same principles and techniques disclosed herein may be applied to temporary installed sound system such as for a rock concert in a stadium. The AV-related devices included in the example AV system 100 are depicted as installed in a venue that includes a first room 102, a second room 104, a third room 106, and a common area 108. The common area 108 may be an open area such as a foyer or other vast room or complex of rooms.

The AV system 100 includes a transmitting AV device 114, such as but not limited by a microphone, a CD player, a DVD player, a guitar, or a hard drive having stored media content. The audio from the transmitting AV device 114 may be played through a plurality of loudspeakers 116 or routed to other receiving AV devices. In other examples, AV signals may be produced by any other type of device. For example, a video camera 115 may produce a video signal.

The AV system 100 may be connected with and communicate through an audio/video (AV) network 120. The AV network 120 may be any form of communication highway capable of carrying AV signals and any other signals related to the AV system 100. The AV network 120 may include fiber optic, wired, and/or wireless communication capability in any of a plurality of protocols, such as Ethernet, USB, RS232, RS485, Firewire, or any other protocol, including AV bridging (AVB) Ethernet.

Audio signals from the transmitting AV device 114 also may be provided to the AV network 120. In the illustrated example, the AV signals may be received and processed by an intermediate device, such as a mixer 124, which functions as both a transmitting and a receiving AV device. An intermediate AV device may be referred to herein as either or both a transmitting AV device and a receiving AV device. Processing by the mixer 124 may be based on configurable settings such as filters, compressors, equalizers, effects, gains, or any other settings that are included in the mixer 124. Following processing by the mixer 124, the processed AV signals may be received by intermediate devices such as a first and a second AV processor 126 and 128 for further processing using configurable settings included in the first and second AV processors 126 and 128. The first and second AV processors 126 and 128 may provide further effects in the AV signals. Audio signals processed by the first and second AV processors 126 and 128 may be received by additional intermediate AV devices such as a first, second, and third amplifier 132, 134, and 138. Additional configurable settings in the amplifiers 132, 134, and 138, such as gain and equalizer ("EQ") settings may be applied in further processing and amplification of the AV signals. The amplified and processed AV signals may drive the respective loudspeakers 116.

The AV signals also may be received by another intermediate AV device such as a fourth amplifier 142, processed and used to drive the respective loudspeaker 116—a receiving AV device—included in the second room 108. Another intermediate AV device such as a wall controller 146 may be used to control the fourth amplifier 142 over the AV network 120. In addition, the wall controller 146 may include a display capable of displaying one or more parameters related to the operation of the AV system 100 that are received over the AV network 120.

The video signal from the video camera 115 may be received by a device configured to receive a video signal. For example, an intermediate AV device such as a video scaler 148 may receive the video signal via the AV network 120. The video scaler 148 may drive a video output device, such as a television 149.

A first PEM 150 also may be included in the AV system 100. The first PEM 150 may be stored in a memory device and executed in any form of computing device, such as an AV-related device. In the example AV system 100, the first PEM 150 is being executed in a personal computer ("PC") having a GUI. In other examples, operation of the first PEM 150 may be distributed among the memory devices of a plurality of computing devices having one or more GUI's. The first PEM 150 may include the capability to selectively display the various AV-related devices and aspects of the AV system 100 in one or more control interface views using the GUI. Alternatively, a plurality of parallel operating PEMs may be used to selectively display the control interface views of the various AV-related devices and the functionality present in a predetermined portion of the AV system 100. Accordingly, in large and complex AV systems, the AV system 100 may be divided so that multiple PEMs may be employed as different subsystems within the AV system 100.

As used herein, the term "control interface" or "control panel" view(s) are defined as graphically-generated user interfaces on a display, hardware-based user interfaces, such as a control surface, and/or a combination of graphically-generated user interfaces and hardware-based user interfaces.

Control interface views that are a system venue view display(s) in the form of a GUI may be generated by the first PEM 150. The system venue view display(s) may be a system-specific depiction of the configuration, identity, and operational parameters of AV-related devices in the AV system 100. The AV-related devices in the AV system 100 may be discovered by the first PEM 150 and included in the system venue view display(s). In addition, the first PEM 150 may individually manage, monitor, and control the AV-related devices in the AV system 100 using the AV network 120. Individual management of the AV-related devices may be performed from a plurality of control interface views that are GUI control interface views.

Each of the AV-related devices may be managed using one or more GUI control interface views that correspond to a respective AV-related device. The one or more GUI control interface views may be generated by the PEM 150 and displayed in the display. The control interface views also may be a control surface included with the PEM 150. As used herein, the term "control surface" refers to hardware, such as buttons, knobs, meters, LEDs, sliders, indicators, numeric displays, or any other hardware-based user interface associated with an AV-related device.

The PEM 150 may identify and use stored, predefined control interface views that are for a corresponding AV-related device based on information provided by the AV-related device over the AV network 120. Such information may include an AV node structure of the AV-related device. Alternatively, the PEM 150 may use generated control interface view(s) that include stored, predefined control interface view(s), stored, predefined aspects of a control interface view, and/or aspects of a control interface view that are generated by the PEM 150 to generate the control interface views. The generated control interface view(s) may be formed based on information, such as an AV node structure, provided by the corresponding AV-related device over the AV network 120.

Stored, predefined GUI control interface views corresponding to the AV node structure of an AV-related device similarly may be identified and used to display the functionality of an AV-related device. In addition, generated GUI control interface view(s) that include stored, predefined GUI control interface view(s), stored, predefined GUI aspects, and/or GUI aspects or control interface aspects that are generated by the PEM 150 may be used to form the GUI control interface views. The generated GUI control interface view(s) may similarly be formed based on information, such as an AV node structure, provided by the corresponding AV-related device over the AV network 120. As used herein, the term "GUI aspect" is defined as each of the features that are displayable in a GUI to provide monitoring, configuration, and/or control of an AV-related device. In addition, the term "component" in the context of control interfaces refers to the various affiliated user interfaces included in a control interface view, while the term "aspect" refers to a standalone user interface that can be integrated into a control interface view.

Accordingly, a stored, predefined GUI control panel/interface view may include a plurality of GUI components that previously have been developed, visually placed, and interrelated in the GUI control interface view. The GUI components may be representative of at least a portion of the functionality of an associated AV-related device. An example of components of a stored, predefined GUI control interface view is a depiction of each of a number of AV channels in a mixer. Each of the AV channels represented may include a slider to control volume, a volume indicator to indicate the position of the slider (in dB), and an AV signal indicator to indicate the incoming signal (in dB). In this example, the slider and the volume indicator could be interrelated such that when the slider is moved the volume indicator reflects the changing magnitude of the volume.

Stored, predefined GUI aspects that are not included in a stored, predefined GUI control interface view include visual/control features that may be added by the PEM 150 to an existing stored, predefined GUI control interface view. These visual/control features may be added to form a GUI control interface view representative of the functionality of a corresponding AV-related device. Such added predefined GUI aspects also may be interrelated with the GUI components included in the stored, predefined GUI control interface view. The PEM 150 also may form a GUI control interface view from one or more of the stored, predefined GUI aspects based on information, such as the AV node structure, provided by an AV-related device. A GUI control interface view may be formed when an AV-related device does not have an associated stored, predefined GUI control interface view(s). In this case, the predefined GUI aspects also may be interrelated within the GUI control interface view that is formed.

If there are no stored, predefined GUI control interface views or stored, predefined GUI aspects of GUI control interface views for a particular AV-related device, the PEM 150 may generate the GUI aspects and the entire GUI control interface view(s) based on information provided over the AV network 120 by the corresponding AV-related device(s). The GUI aspects may similarly be interrelated.

Accordingly, due to the networked configuration, the PEM 150 may be configured to manage the end-to-end operation of the entire AV system 100 and the individual AV-related devices. Troubleshooting, storage of AV system and AV-related device settings, network management, and network communication management also may be performed with the first PEM 150.

The mixer 124 may include a second PEM 152. Operation of the second PEM 152 may be configured similarly to the first PEM 150 to include monitoring, control, and storage functionality. In addition, a third PEM 154 also having similar functionality may be positioned in an offsite location 160 such as an office building.

The functionality of the PEMs 150, 152, and 154 may be configured based on the processing power of the respective devices in which the PEMs 150, 152, and 154 operate. In addition, the PEMs 150, 152, and 154 may be configured to provide the desired level of functionality and features. For example, the third PEM 154 located in the offsite location 160, may operate in a computing device, such as a computer with a GUI, to perform an oversight role. Accordingly, error logging, alarming, and system operation may be monitored with the third PEM 154. GUI control interface views displayed with the third PEM 154 to support performance of the oversight role may be accessed from the library and/or generated based on communication with the AV-related devices as previously discussed for the first PEM 150. The third PEM 154 also may be configured with the capability to view and adjust individual AV-related device settings to provide remote technical and troubleshooting assistance within the AV system 100.

The second PEM 152 may share the user interface and processing capability of the mixer 124 with the functionality of the mixer 124. Accordingly, the second PEM 152 may have reduced functionality if less computing power, such as processing, data storage and/or display capabilities are present in the mixer 124. The second PEM 152 may be configured to determine the operational capability of the AV-related device in which the second PEM 152 is operating.

Functionality of the second PEM 152 may be conformed to the determined operational capability of the mixer 124. Accordingly, if the mixer 124 has a communication port and/or memory capability that limits communication and/or display of operating parameters and settings of itself, or other AV-related devices in the AV system 100, the second PEM 152 may use relatively smaller less complex control interface views. In addition, the second PEM 152 may request a smaller portion of the operational parameters and settings of the AV-related device. For example, if the AV-related device is a two channel AV amplifier, the second PEM 152 may display only one channel and obtain operational parameters and settings associated with the displayed channel. When the second channel is requested, the second PEM 152 may display only the second channel and associated operational parameters and settings.

Figure 2:
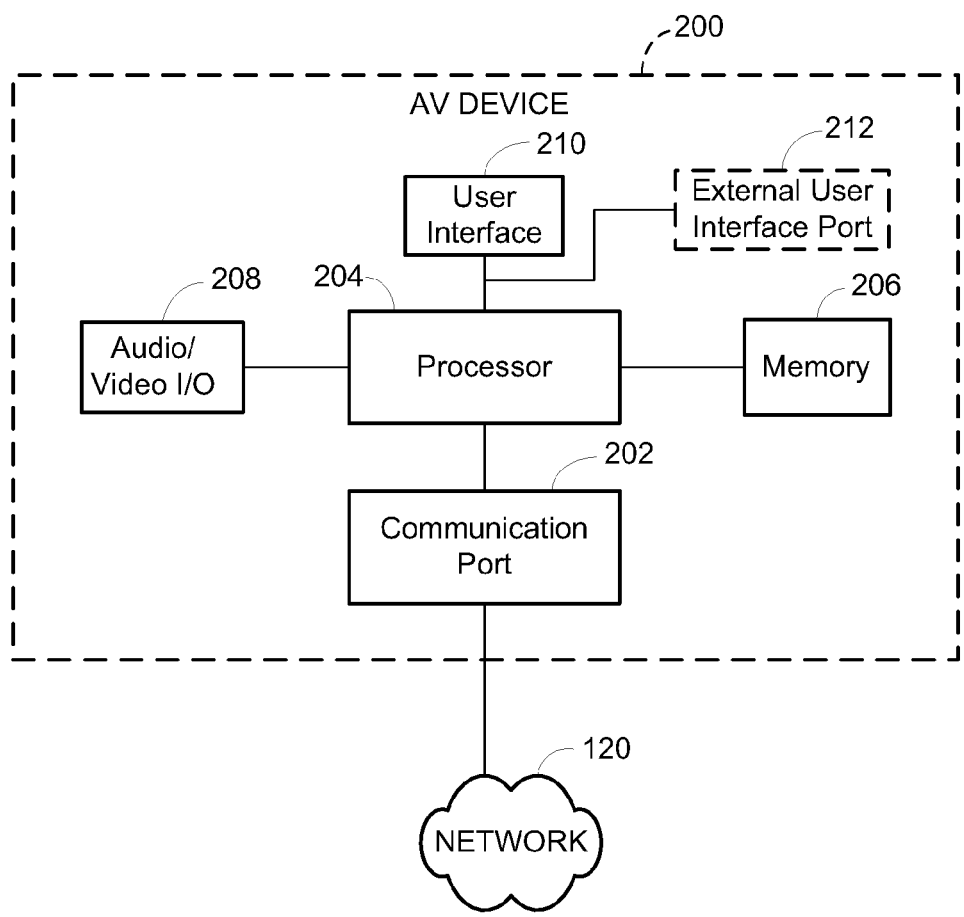
FIG. 2 is a block diagram of an example of one of the AV-related devices illustrated in FIG. 1.

FIG. 2 is a block diagram of an example of an AV-related device 200 coupled with the audio/video (AV) network 120. The AV-related device 200 may be a mixer, an amplifier, a microphone, a lighting panel, a wall controller or any other device related to an AV sound system and/or AV performance. The AV-related device 200 includes a communication port 202, a processor 204, memory 206, AV input-output (I/O) 208, and a user interface 210. Optionally, the AV-related device 200 may include an external user interface port 212. In other examples, more functionality may be depicted in the AV-related device 200. In addition, fewer or additional blocks may be used to describe the functionality of the AV-related device 200.

The communication port 202 may be any configuration of hardware and/or software that enables communication over the AV network 120. The processor 204 may be any device capable of executing instructions, logic tasks, and/or operating code to manage overall functionality, perform calculations, control inputs/outputs, etc., within the AV-related device 200. The processor 204 also may control the operation of the communication port 202.

The memory 206 may be a volatile and/or a non-volatile memory device that is configured to store instructions executable by the processor 204, settings of the AV-related device 200, an AV node structure useable by the PEMs (described later), operational parameters, set points, and any other data or information pertaining to the AV-related device 200 and operation in the AV system 100 (FIG. 1). The memory 206 is a medium that preserves data for retrieval, such as instructions retrieved for execution. It may include a hard disk drive, a compact disc drive, a digital versatile disc drive, a Random Access Memory ("RAM"), a Read Only Memory ("ROM"), a Programmable Read-Only Memory ("PROM"), an Electrically Erasable Programmable Read-Only Memory ("EEPROM"), a flash memory, or any other digital storage device.

The AV I/O 208 may be any inputs and outputs that are provided directly to the AV-related device 200. For example, an AV amplifier may have AV inputs that are processed and amplified and sent to outputs that are used to drive a loudspeaker. The user interface 210 may include buttons, sliders, knobs, a touch screen, or any other form of interface that allows user commands to be provided to the AV-related device 200. In addition, the user interface 210 may include any form of AV and/or visual outputs for receipt by a user of the AV-related device 200. Example AV and/or visual outputs include light emitting diodes ("LEDs"), meters, displays, such as liquid crystal displays ("LCDs"), or any other mechanisms providing indication to a user of the condition and/or operation of the AV-related device 210.

The external user interface port 212 may be an optional communication port that allows the AV-related device 200 to communicate with one or more other AV-related devices. The external user interface port 212 may provide a communication link to other AV-related devices that is outside of the communication path provided by the AV network 120. For example, an amplifier communicating on the AV network 120 may receive an input signal via the external user interface port 212 from a wall controller. An example wall controller may have outputs that are digital signals associated with a rotary switch, and inputs that are a feedback indication displayed on a display included in the wall controller. In this example, the wall controller may provide the input signal to adjust the output gain of the amplifier. In addition, the wall controller may receive an output signal from the amplifier via the external user interface port 212. The output signal may be representative of the output gain, and may be displayed on the display of the wall controller.

Figure 3:
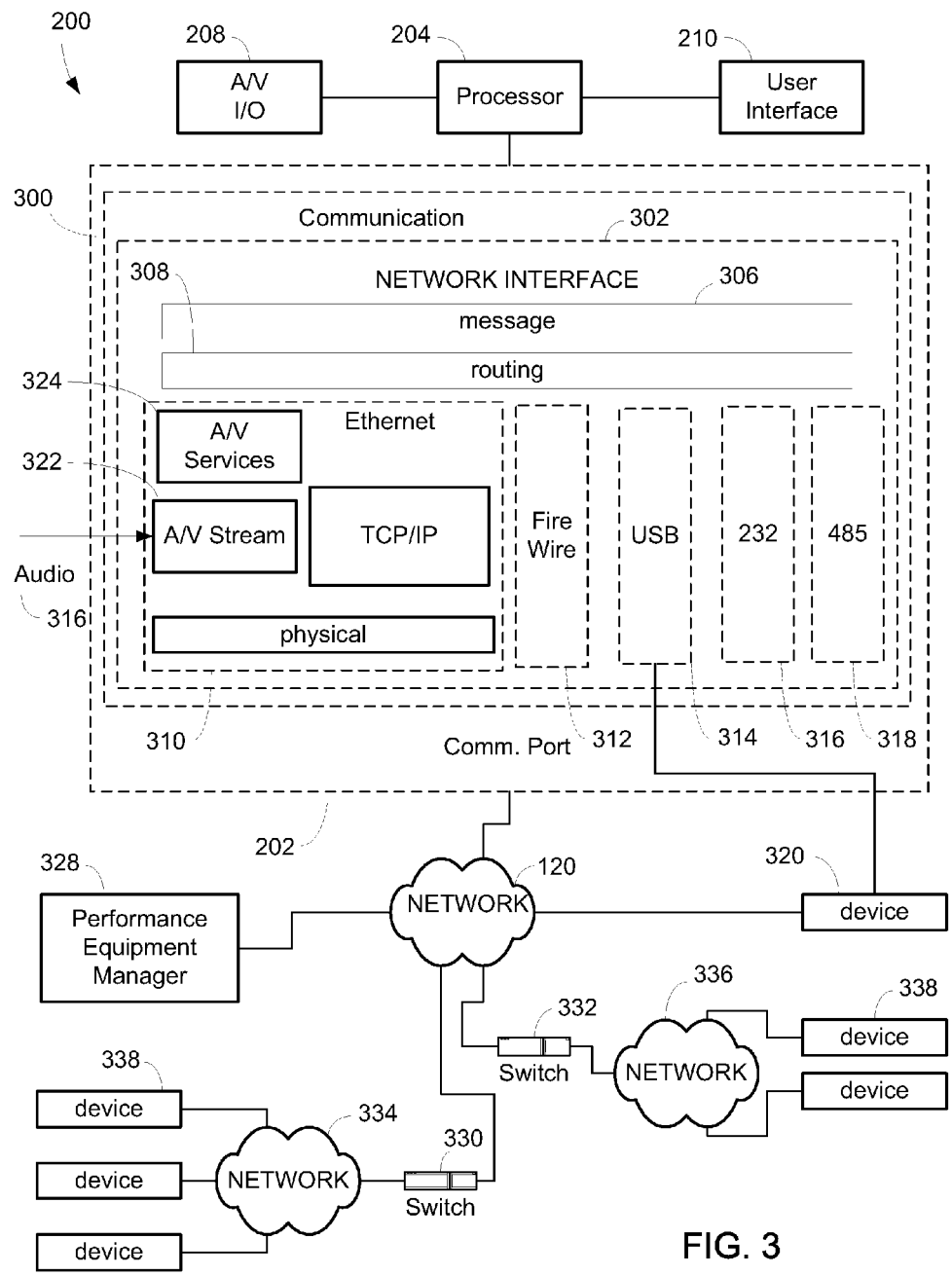
FIG. 3 is a more detailed block diagram of the AV-related device of FIG. 2, and a portion of the AV system depicted in FIG. 1.

FIG. 3 is a more detailed block diagram of a portion of the AV-related device 200 illustrated in FIG. 2 and a portion of the audio/video (AV) system 100 illustrated in FIG. 1. In FIG. 3, the communication port 202, the processor 204, the AV I/O 208, and the user interface 210 are depicted. The communication port 202 includes a communication module 300 having a network interface 302. The communication module 300 may be stored in memory 206 and may be used for any communication external to the AV-related device 200.

The network interface module 302 includes a message layer 306 and a routing layer 308. The message layer 306 is configured to communicate messages between the AV-related device 200 and other AV-related devices and/or equipment in the AV system. Various aspects of messaging within the AV system are discussed in detail later. The routing layer 308 includes a plurality of subsystems capable of communication with different protocols and/or physical media combinations. An Ethernet communication link 310, a Fire Wire communication link 312, a USB communication link 314, an RS232 communication link 316, and an RS485 communication link 318 may be used within the AV-related device 200. In other examples, any other form of communication link may be used to transfer AV signals, AV-related device settings, and data related to the AV system. For example, an AV-related device 200 may communicate over the AV network 120 using the Ethernet communication link 310, or directly with another AV-related device 320 using the USB communication link 314 as illustrated in FIG. 3. The various communication links that interface with the routing layer 308 each may include a packet service layer, a reliability layer, a network layer, a data link layer, and a physical layer. Within each of the communication links, the routing layer provides messages received over the AV network, or from other AV-related devices.

An AV stream module 322 and an AV services module 324 also may be included in the network interface 302. The AV stream module 322 may receive an AV signal 316 and transmit the AV signal 316 as streaming AV over the AV network 120. In addition, the AV stream module 322 may receive streaming AV from the AV network 120. An example audio streaming module is a Cobranet system manufactured by Peak Audio of Boulder, Colo.; and an example AV system is an AVB Ethernet system manufactured by Harman International Industries of Northridge, Calif., the Assignee. The streaming AV may be transmitted between the AV stream module 322 and another AV stream module in another AV-related device. The AV stream modules of different AV-related devices are compatible to communicate.

The AV services module 324 is operable to automatically configure the AV stream modules 322 to create compatible communications between different AV stream modules. The AV services module 324 may compare the capability of each of the AV stream modules 322 based on the settings of the network interface modules of the corresponding AV-related devices. Based on negotiations with other AV services modules, the AV services module 324 may select settings that are compatible and common to all the AV stream modules. Accordingly, all of the AV steam modules may be configured with settings based on the AV-related device with the most limiting communication capabilities. By automatically negotiating the settings, the AV services module 324 may configure all the AV stream modules in the AV system to be compatible and capable of communication with each other. Example settings that may be automatically negotiated by the AV services module 324 include channel count, bit depth, sample frequency, and latency.

In FIG. 3, the AV-related device 200 also may communicate over the AV network 120 with a PEM 328. As previously discussed, the PEM 328 may manage, control and monitor the AV-related device 200 over the AV network 120. A first and second switch 330 and 332 also may be coupled with the AV network 120. The first and second switches 330 and 332 may provide a communication path between the AV network 120 and a respective first AV network 334 and a second AV network 336. A plurality of other AV-related devices 334 may be coupled with the first and second AV networks 334 and 336. Other AV-related devices 338 may be capable of communication over the AV network 120 using the first and second switches 330 and 332.

The functionality within each AV-related device may be represented with an AV node structure. The AV node structure also may be used to generate one or more GUI control interface views within a GUI. The GUI control interface views may be used to monitor, control, and configure a corresponding AV-related device. In addition, the AV node structure may be used to configure one or more control surfaces.

Figure 4:
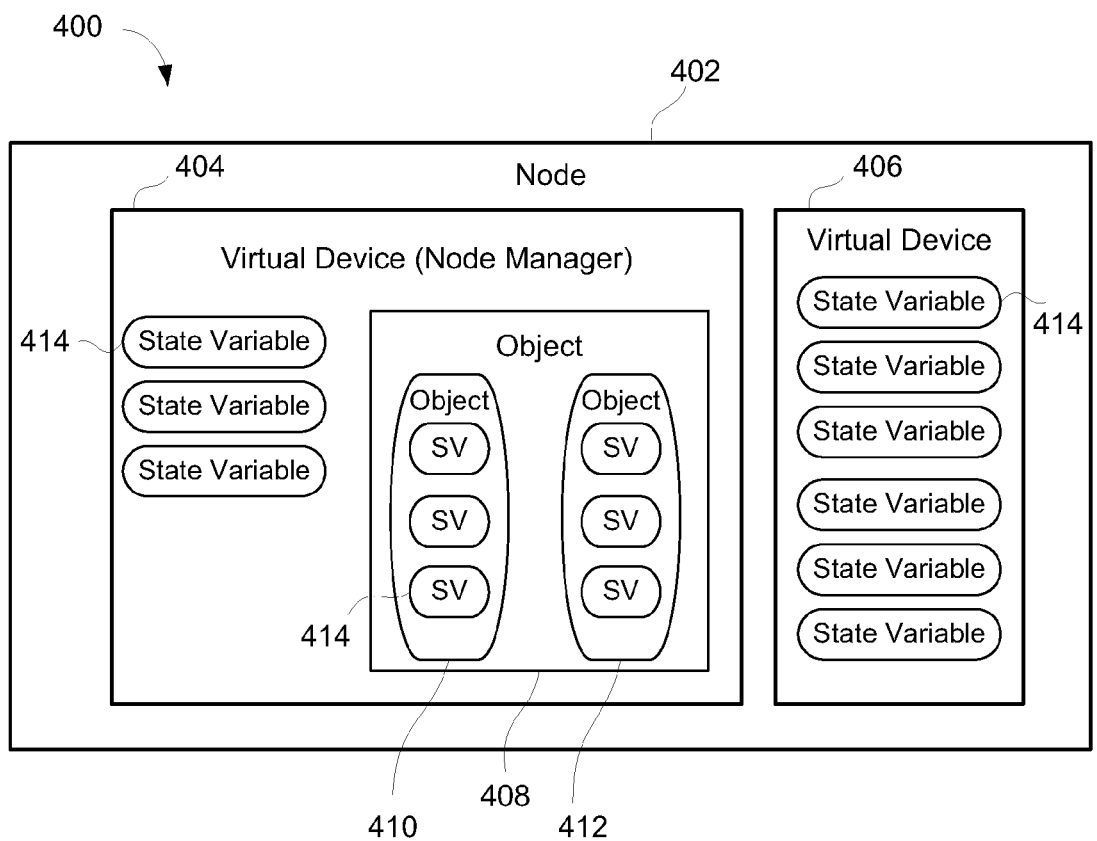
FIG. 4 is a block diagram of an example AV node structure representative of an AV-related device.

FIG. 4 is an example of an audio/video (AV) node structure 400 representative of an AV-related device. The AV node structure 400 includes a plurality of components included in a node 402. The node 402 may be representative of the AV-related device and includes a node ID. Alternatively, a node may form a sub-component of a larger system where a number of nodes are present to form a functional, AV-related device. Each node may include one or more virtual devices. Each virtual device may include one or more objects and state variables (SVs). Each object in a virtual device may include additional objects and also state variables. Nodes that are configured with network capability may communicate over one or more network interfaces.

In FIG. 4, the example node 402 includes components that are a first virtual device 404 and a second virtual device 406. In other example configurations, additional or fewer virtual devices may be included based on the functionality of the particular AV-related device. The first virtual device 404 is a node manager virtual device that is configured to be responsible for node level operations. For example, the node manager may maintain a list of virtual devices in the node 402. Using the virtual device list, the node manager virtual device may communicate to other AV-related devices what virtual devices are present in the node. In addition, the node manager virtual device may be responsible for maintaining any node level information.

The first and second virtual devices 404 and 406 are the top level of a three level hierarchy representative of each of the devices in the system. In general, each of the virtual devices in an AV node structure is representative of functional units within a device. The first virtual device 404 includes an object 408 representative of the second hierarchical level. As detailed later, objects may be used to represent processing blocks, control elements, status elements, etc. The object 408 may have additional components including are a first object 410 and a second object 412. The first and second objects 410 and 412 represent additional functional elements within the object 408. Objects may represent data that defines an equalizer or, pertinent to the present disclosure, that may define the routing of audio between AV devices. Each AV object defines specific attributes of the AV architecture and may contain one or more state variables (SVs).

The first and second objects 410 and 412, the first virtual device 404 and the second virtual device 406 each include components of the AV node structure that are state variables (SVs) 414. As detailed later, SVs are data variables that may be varied, such as a frequency, a fader position, a delay time, or any other changeable parameter within a device. Accordingly, such variable data points may be present in virtual devices and/or objects depending on the functionality of the specific AV-related device being represented with an AV node structure. State variables are representative of the third hierarchical level.

The nodes 402, the virtual devices 404 and 406, the objects 408, 410 and 412 and the state variables 414 are the components that make up the AV node structure of each AV-related device. The nodes 402, the virtual devices 404 and 406, the objects 408, 410 and 412 and the state variables 414 may be in any configuration that reflects the functionality of a particular AV-related device. Accordingly, the AV node structure of different AV-related devices may be the same or may vary significantly.

Each of the nodes 402, the virtual devices 404 and 406, the objects 408, 410, and 412 and the state variables 414 (i.e. the components) may include attributes. The attributes may describe how the associated node, virtual device, object or state variable is used, a name, a unit of measure and/or association with other virtual devices, objects and/or state variables. In addition, attributes may provide descriptive information, such as placement in a control panel view of the corresponding virtual devices, objects and state variables, wiring details, or any other descriptions or characteristics of the corresponding component.

Within the AV node structure of an AV-related device, there may be no distinction between components used for signal processing such as a parametric EQ, control components such as a mechanical fader, or sensor components such as an output meter. In addition, global items, such as passwords and musical instrument digital interface ("MIDI") channels, may be included in the AV node structure. By representing all of the functionality of the different AV-related devices included in an AV system with state variable(s), object(s), and/or virtual device(s), the same mechanisms for communication, such as subscriptions and control, can be universally applied throughout an AV system that includes a wide variety of different AV-related devices.

A node can dynamically create and destroy virtual devices contained therein. A program operable in an AV-related device is an example of a dynamically-created virtual device. Another example is an automation virtual device for a control panel view in an AV-related device. Objects also may be dynamically created and destroyed. Examples of dynamically created objects may be an insert on a control panel view of an AV-related device. In this example, an effect object may be instantiated, and then objects may be linked to the effect object through modification of state variables that have routing attributes configurable to describe such linkage.

Within the AV node structure, modifiable parameters in an AV-related device's functionality may be held within the state variable ("SV") component. Thus, SVs include actual values that may be measured values, set point values, tuning values, setting values, or any other parameter that is a changeable parameter within an AV-related device. The parameter may also be controllable by another AV device or PEM. Actual values may be automatically updated, manually updated, and/or logically updated based on other actual values. Examples of SVs include the parameter(s) of an AV object like frequency and the position of a fader on a control surface. Simple AV-related devices like a wall controller may contain only a limited number of SVs. Other AV-related devices, such as a mixing console may contain hundreds of thousands of SVs. Typical operations on SVs include 'set' a variable and 'get' a variable. For example, such operations could translate to setting the frequency of an EQ and getting a delay time for display on a control surface of the AV-related device. These basic operations may form the basis of more complex forms of usage such as automation.

In addition to holding the value of an AV parameter, an SV also may possess a number of attributes that describe how the corresponding SV may be used. Examples of two attributes are 'minimum' and 'maximum' that represent the range of dB values to which a Gain SV may be set. Another attribute could be the data type used to hold the dB value. For example, the date type could indicate an SV as an IEEE float, a byte, or a word. Accordingly, by including the attributes information, the SV may be accessible to other AV-related devices in the AV system even when the other AV-related devices have not been programmed specifically for the SV and therefore do not know the characteristics of the SV. Thus, attributes may be used by other AV-related devices that do not have prior knowledge to discover the attributes and thus gain the knowledge required to use the SV.

Attributes also may provide information that is descriptive of the AV node structure. Accordingly, when some portion of an AV node structure is unknown, attributes associated with the unknown components may be used to determine the functionality of the components. In addition, attributes may provide a correspondence between the AV node structure and control panel views. For example, attributes may be used to identify stored, predefined control panel views for an AV-related device. In addition, attributes included in the AV node structure may provide information to form a control panel view when a stored, predefined control panel view does not completely correspond to the AV node structure, or does not exist at all. Thus, when an AV node structure of an AV device does not have corresponding stored, predefined control panel view(s) or stored, predefined aspect(s), the attributes of the AV node structure may provide information to generate control panel view(s) and/or aspect(s).

The attributes also may include information to allow integration or incorporation of a generated aspect into a stored, predefined control panel view or to form a number of generated aspects into a control panel view. For example, an AV node structure could include objects and SVs representative of channels in a mixer or other AV device. Attributes associated with the objects and SVs could indicate that the channels should be displayed as percent with sliders to provide control capability. In addition, the attributes could describe the placement of the various aspects that are generated with respect to each other. Further, attributes could describe how the wiring between aspects should be displayed, interrelationships between aspects, colors, sizes, shapes, or any other parameters related to display of the functionality of an AV-related device in a control panel view. The concept of attributes is applied throughout the AV node structure and includes SV, objects, virtual devices, and node manager virtual devices.

An attribute may be classified into one of three categories that represent the way in which it may be used. The categories of attributes include static, instance, and dynamic. A static attribute is fixed and does not change. Accordingly, a database of static attributes can be defined that minimizes the amount of discovery required to control components, such as an SV in the AV node structure. An instance attribute may be set per instance of an SV. A dynamic attribute is a static attribute or an instance attribute that may be client-set or modified at runtime. Static and instance attributes may be queried. Dynamic attributes are generally similar to either static or instance attributes. Dynamic attributes differ from static or instance attributes, however, because their values may be overridden at run-time.

Attributes may include an attribute identification ("attribute ID") and a class identification ("class ID"). The attribute ID is a way of uniquely identifying each attribute. The attribute ID may be enumerated from zero using an unsigned byte ("UBYTE") and may be represented with a predetermined name. The attributes at each level of hierarchy of the AV node structure may have their own enumeration. Thus, for example, an attribute ID of 3 for a SV class may refer to a different attribute in an object class. The class ID may be represented with a predetermined number, such as an unsigned word ("UWORD") that identifies a unique grouping of attribute values—the class ID. For example, if a SV has eleven attributes all set to specific values, this collection of attributes and their values may be identified as a SV class and assigned a representative class ID. This class ID may be used as a form of shorthand to save describing the attributes in long form. Class ID may be used in all levels of the hierarchy to represent sets of attribute values—SV class, object class, etc. To encourage the re-use of SV and object classes, a master list of class IDs may be maintained, and classes may be registered.

A class, such as an SV class, an object class, a virtual device class or a node manager virtual device class may be represented numerically and by a string name, such as by the class ID ("UWORD") and a class name ("STRING"), respectively. Each class ID may include a set of attributes, such as an ID, an attribute name and a category. Class names may be prefixed to identify the hierarchical level in the AV node structure. For example, a class name of SVs may be the term "SVClass." Example SV class names are SVClassPeqFreq, SVClassPeqQ, and SVCassPeqGain. A class ID also may be used for any of a SV class, an object class, a virtual device class and a node manager virtual device class.

An example set of attributes in a SV class ID are:

TABLE 1

| ID | Attribute Name | DataType | Category |
| --- | --- | --- | --- |
| 0 | Data Type | | Static |
| 1 | Name String | | STRING Instance + Dynamic |
| 2 | Minimum Value | Data Type | Static + Dynamic |
| 3 | Maximum Value | Data Type | Static + Dynamic |
| 4 | Control Law | | Static |
| 5 | Flags | UBYTE | Static |
| 6 | Default Value | Data Type | Instance |
| 7 | Control Primitive | | Instance |
| 8 | Control Coordinates | | Instance |
| 9 | Encoder Mode | UBYTE | Instance |

An object class and its associated class ID may define specific a priori knowledge of the object. The object class may enable an object to be wholly defined by the object class and the values of the SVs. An object class may be formed from static and instance attributes. Static attributes that define an object class may include any sub-objects contained by the object and any SVs contained by the object. For example, a three-band Equalizer and a five-band Equalizer would be different object classes because they contain different numbers of SVs. The object class ID may be a UWORD used to specify the object class. There may be one master registry of object class IDs. Developers may register their object class IDs with the master registry. In addition, the same objects may be used across families of AV-related devices. The object class ID may include a set of attributes as previously described. An object class may have a naming convention that begins with the phrase "ObjClass."

An example set of attributes in an object class ID are:

TABLE 2

| ID | Attribute Name | Data Type | Category |
| --- | --- | --- | --- |
| 0 | Class Name | STRING | Static |
| 1 | Name String | STRING | Instance |
| 2 | Flags | UBYTE | Instance |

A virtual device or a node manager virtual device also may include a class. The class of a virtual device and associated class ID may represent a virtual device's unique characteristics and may be used for easy identification and differentiation of different kinds of virtual devices. An example of two different kinds of virtual devices is an Automation virtual device and an input surface virtual device within a node of an AV-related device, such as a mixing console. An example allocation of a unique class ID can be allocation of a class ID to a group of virtual devices representative of distinct software programs included in one or more AV-related devices. The class ID of a virtual device may be represented as a UWORD. The virtual device also may have a class name. The virtual device class name may be used to provide a human readable shorthand for the user. This class name need not be unique.

An example set of attributes in a virtual device class ID are:

TABLE 3

| ID | Attribute Name | Data Type | Category |
| --- | --- | --- | --- |
| 0 | Class Name | STRING | Static |
| 1 | Name String | STRING | Instance |

An example set of attributes in a node manager virtual device class ID includes:

TABLE 4

| ID | Attribute Name | Data Type | Category |
| --- | --- | --- | --- |
| 0 | Class Name | STRING | Static |
| 1 | Name String | STRING | Instance |
| 2 | Flags | UWORD | Instance |
| 3 | Serial Number | BLOCK | Instance |
| 4 | Software Version | STRING | Instance |
| 5 | Reserved | UWORD (Set to 0) | |
| 6 | Hop Count | STRING | Instance + Dynamic |
| 7 | Venue Table Size | STRING | Instance + Dynamic |
| 8 | User Name A | STRING | Instance + Dynamic |
| 9 | User Name B | STRING | Instance + Dynamic |
| 10 | User Password A | STRING | Instance + Dynamic |
| 11 | User Password B | STRING | Instance + Dynamic |
| 12 | Address Mode | UBYTE | UBYTE + Dynamic |

The "BLOCK" data type with reference to virtual device class ID 3 represents a data structure composed of a size N and N bytes of data. The BLOCK may be considered a network control protocol data storage structure of the type of which the SVs may consist. The BLOCK data storage structure may be of variable length, which can be used to store any sort of data. In additional, or alternatively, a STRING data storage structure may be used. As will be discussed in more detail below, the BLOCK (OR STRING) data storage structure may, in some examples, store data values that AV devices are able to parse for the configuration of an AV route through the AV system.

Static attributes may be predefined for each of the classes. For example, a SV class may include the static attributes of a set of data types to represent different SV values, a minimum SV value, a maximum SV value, a control law, and flags. The control law may describe how the SV should be controlled. For example, an SV for frequency may be logarithmic, or a gain SV may be logarithmic with extra resolution around 0 dB. If an SV can take on any floating-point value between the class Min and Max, it may be desirable to specify a control law to give a certain look and feel to a user. For example, in the case of a frequency variable, it may be desirable, when the user turns an encoder or pushes an "up" control on a spinner, for the next value to be logarithmically spaced from the previous value. The control law also may be used to specify the granularity that an SV can accept. For example, a gain SV may have a maximum resolution of 0.1 dB. The control law may be omitted in the case of an enumerated SV, since all steps are predefined.

Flags may be predefined to further define the SV associated with the attribute. Example flags include sensor attributes that may be used in subscriptions to automatically set the type of subscription to periodic or on change. Examples of sensor SVs include output meters, threshold meters, or power amplifier temperature. Example non-sensor SVs include frequency or MIDI channels. Other example flags include an event type to indicate that an SV can be subscribed to with an event subscription, and a modified flag to indicate a change such as when the maximum, minimum, or SV name string has been changed from the documented static class value. Although the SV name string is an 'instance' attribute within the SV class, it is normally static within the object, and therefore any changes made to it may be tracked with the modified flag.

An object class, a virtual device class, or a node manager virtual device class also may include static attributes, such as a class name. An object class name may be used to provide a human-readable shorthand for the user. The object class name need not be unique among families of AV-related devices. For example, a first AV-related device that is a mixer may have the object class Name 'ObjClassSC_PEQ_5' and a second AV-related device in the same family of AV-related devices, such as a dbx DriveRack may have the object class name 'ObjclassDR_PEQ_5.' Both AV-related devices may have the class name "5 Band PEQ." The class name may be selectable from a drop down on a GUI control panel view and may be stored as a STRING.

In virtual devices, static attributes may be those attributes belonging to the virtual device that have the values associated with the class ID. In one example, the static attributes may not be set per-instance nor changed dynamically at run-time. Static attributes for virtual devices also may include a name string. The name string may be used to name the instantiation of the virtual device. The name string can be the same as the class name. Where there are multiple instances of the same name, the multiple instances may be differentiated by appending a space and decimal number. For example, if in an AV-related device that is a mixer, there were two instantiations of an input fader bank with a virtual device class name of "MHx Input Bank," the virtual device name strings for each instance could be "MHx Input Bank 1" and "MHx Input Bank 2."

Static attributes of node manager virtual devices also may include the class type. The class type of the node manager may determine the value of the static attributes of a node manager. The attributes may not be varied on a per-instance basis nor changed at run-time. For example, a static attribute in a node manager class for a particular type of AV-related device will have the same value on each and every instantiation of the node manager. The node manager also may include a static attribute indicative of a venue table size. The venue table size static attribute may be queried to discover the size of a venue table supported by the AV-related device.

An instance attribute is a static attribute that may be set to a unique value for each instance of a SV, object, virtual device or node manager virtual device class. With regard to SVs, the object or virtual device may instantiate the SV that defines the values. Accordingly, these attributes may be static to the object or virtual device. The SV class may include instance attributes such as a SV ID, a Name String, a Default Value, a control primitive, a control coordinate and an encoder mode. The SV ID may be a UWORD that is used as an identifier of each SV within an object or virtual device. SV IDs need not be zero based nor fully populated within the object or virtual device. The SV name string may provide a human readable prompt for the SV. This string need not be unique to the SV within the object. For example, for each band of a parametric EQ, each SV representing gain can have the SV name string "Level." The default value may be used to initialize an object or virtual device. The default value may be expressed in the data type of the SV. The default value may be dynamic so that a programmer may uniquely specify this according to the needs of the object. For example, a crossover object with two crossover frequency SVs may want them initialized to 100 Hz and 1.0 kHz, respectively. The control primitive may be used to make a generic GUI control panel view or generic GUI aspect for the object or virtual device. The object or virtual device may suggest the control primitive to be used for each SV. The control coordinates may be used for placement of the control primitives for a generic GUI control panel view or a generic GUI aspect. The encoder mode may recommend how to display a SV value on a GUI aspect, such as an encoder. The Encoder Mode attribute's Data Type may be a UBYTE.

Objects also may include instance attributes, such as a name string. The name string may be a name of the instantiated object and may be stored in a STRING data type. For example, a product could have an object class "Input_Channel" with instantiations "Input 1", "Input 2", etc. Objects also may include instance attributes that are flags. The flags may provide information about the corresponding object. For example, one of the flags may be a modified flag. The modified flag may be a bit that indicates when one or more SVs within the object have been modified from their static class definition. Possible modifications may be listed under 'SV Dynamic Attributes.' Upon recognition of a modified object, another AV-related device with a control surface may perform further queries to resolve the changes.

In the examples of Table 4, the virtual device name string of the node manager virtual device may designate both the name of a node and a workgroup to which the node belongs. The name string attribute may be user-configurable and storable in non-volatile memory. The serial number attribute may be a unique number identifying each node. The unique number may be used, for example, to resolve address conflicts. One type of example serial number may be a statistically-unique 128-bit ID that is a hexadecimal number string. Generation of the statistically-unique 128-bit ID may be performed, for example, with a PC running the Microsoft application 'uuidgen.' The generated serial number may be written into the non-volatile memory of the node during manufacture and never changed. Another type of example serial number is a 48-bit Ethernet MAC address with the top 80 bits set to zero. Where an AV-related device has two or more network interfaces, the MAC address from the interface that is usually enabled, or enabled more often, may be used.

The software version attribute in Table 4 may be the revision of embedded firmware or PC application software operable in the AV-related device. The software version may be represented by a string of any format. A hop count attribute may be used to indicate the number of hops an outgoing message will be initialized with. The data type of the hop count attribute may be a UBYTE and the default can be a predetermined number of hops. The user name A-B attributes may contain a user name for each category of user. The user password A-B attributes may contain a password for each category of user.

The address mode attribute in Table 4 may control whether the node chooses a random or sequential node address during address negotiation. Address negotiation is described later. In an example AV system, all AV-related devices may be set to use random addressing to minimize the possibility of address clashes. Alternatively, in other AV systems, such as in a tour sound AV system, it may be desirable to have nodes sequentially numbered. Accordingly, the address mode attribute may be set to sequential node addressing, and sequential numbering may be achieved by turning on nodes (AV-related devices) one at a time and having each successive one choose an address, which is one higher than the last. The address mode attribute may be contained in a UBYTE with an example format of 0—Random and 1—Sequential.

Dynamic attributes are a sub-set of attributes that may be client-set or modified at run-time. This is useful when setting user-defined ranges and names for SVs. In this example, the SV attributes that may be modified dynamically are minimum value, maximum value, and name string. When the modifiable attributes deviate from their published values and become 'dynamic,' the discovery process may require an extra step to determine the actual values. For this reason the list of dynamic attributes may be limited to situations where there is a specific need in order to limit the extra overhead during discovery.

Virtual devices also may utilize dynamic attributes. For example, dynamic attributes may be included as part of the class ID of a virtual device. In this example, the dynamic attribute may be a bit flag used to indicate that the virtual device may be reconfigured at run-time to contain different objects. When the bit flag is cleared, the dynamic attribute may indicate that the virtual device contains a static configuration of objects and may be wholly known by its class ID. The specification of more than one dynamic virtual device class may occur in an AV-related device when the AV-related device is reconfigurable. In this scenario, a reconfigurable AV-related device may use a dynamic virtual device to represent a set of AV-related functions or operations executed in the AV-related device. Accordingly, the class type may be used to identify the version of the set of AV-related functions or operations. In addition, the class type may be used to determine if a set of AV-related functions or operations are compatible with a software patch, a software upgrade, a set of AV-related functions or operations in another virtual device, etc. For example, if a user copies the values of a set of AV-related functions or operations of an AV-related device that is represented by a dynamic virtual device to a clipboard, a simple check of the virtual device type would stop the user from being able to paste the values of that set of AV-related functions or operations to an incompatible set of AV-related functions or operations in another AV-related device that has its own unique dynamic virtual device class.

The SVs, objects, and virtual devices support communication between the AV-related devices. Query and modification of SVs, objects, and virtual devices may be with a message based communication infrastructure. In addition, direct calling to perform queries and modification via pointers and the like is also possible. The communication infrastructure may be predefined so that the support of the communication using SVs, objects, and virtual devices may be uniform across different AV-related devices with different AV node structures.

Various forms of "get" messages may be supported. Get messages may include get attribute messages to obtain the attributes associated with one or more SVs, objects, or virtual devices. In addition, get messages may request the actual values from a SV, such as with a get value string message. In the case of objects and virtual devices, get messages to provide lists or tables may be supported. As discussed later, a list of virtual devices within a node may be requested from the virtual device node manager. Similarly, lists of components inside of other components, such as a list of objects or SVs within a virtual device and/or a list of objects within an object may be requested with get messages. Get messages also may be supported by virtual devices and/or objects to provide information related to inputs and outputs included in the functionality represented by the respective virtual device or object. For example, messages may query for a virtual device I/O list and/or an object I/O list. Further, get messages to provide any other information, related to the SVs, objects, and/or virtual devices also may be supported.

"Set" messages also may be supported. Set messages may set the actual value in a SV, set an attribute, set one or more values in a list, modify a table, etc. In addition, "subscribe" and "unsubscribe" messages may be supported by the SVs, objects, and virtual devices. As opposed to "get" messages that involve poling an AV-related device for information, "subscribe" messages may create an event-driven mechanism for providing information. For example, a subscribe message may be used to request that anytime the actual value(s) of SV(s) within a component change, the changes are provided. Such subscribe messages may be supported to allow subscriptions between one or more individual, AV-related devices with the same or different AV node structures. For example, a first object or virtual device in a first AV-related device may subscribe to all the SVs, selected SVs, or one SV in one or more other objects and/or virtual devices in a second AV-related device. Subscribe messages may be related to any information available about a component, such as actual values, errors, configuration, and/or status.

A GUI core (not shown) of a PEM 150 may include a link manager (not shown) that keeps track of which GUI controls are visible to the user on a particular control panel view and which SV values are associated with the GUI controls. The link manager may be configured to manage subscriptions to multiple other AV-related devices or control interface views. When the managed data variables change, the link manager module may notify other AV-related devices and/or control interface views of the change. In response to the notification, the other AV-related devices and/or control interfaces may subscribe to the AV-related device with the changed data variable, to request receipt of the updated data variable. In some examples, the link manager module may also be configured to lessen the subscription burden for a particular AV-related device. Accordingly, the use of the link manager reduces network traffic. Additionally, the distribution of the subscription load increases the speed of updating data.

More specifically, the link manager may include a link engine and an event engine. The event engine may be notified of changes to actual values of any SVs in the control panel view or corresponding AV-related device. When changes to SVs in the control panel view occur, the link engine may notify any control panel views and/or AV-related devices that are associated with the changed SV. In response to the notification, the control panel views may request the updated actual value of the SV from the control panel view in the corresponding product plugin or the generic plugin instead of from the AV-related device. Accordingly, network traffic to and from the AV-related device may be minimized since the various control panel views are updated with data that is in the PEM.

Similarly, when an SV changes at the AV-related device, the device may be subscribed to only one control panel view. Accordingly, when the one control panel view is updated by a message from the device, the event engine may notify all the corresponding control panel views that display the changed actual value of the SV. In response, the corresponding control panel views request the updated actual value of the SV from the updated control panel view instead of the device. For example, each AV-related device may include a configuration state. The configuration state may be a single number that represents which SV(s) in the AV-related device have been changed. The configuration state may be useful for determining whether significant changes have been made to a device from another GUI control panel view, as well as other diagnostic and maintenance-related activities.

Other details regarding networked control protocol in the AV system 100 are disclosed in U.S. Provisional Application No. 61/187,487, filed Jun. 16, 2009, which is incorporated herein by reference.

Figure 5:
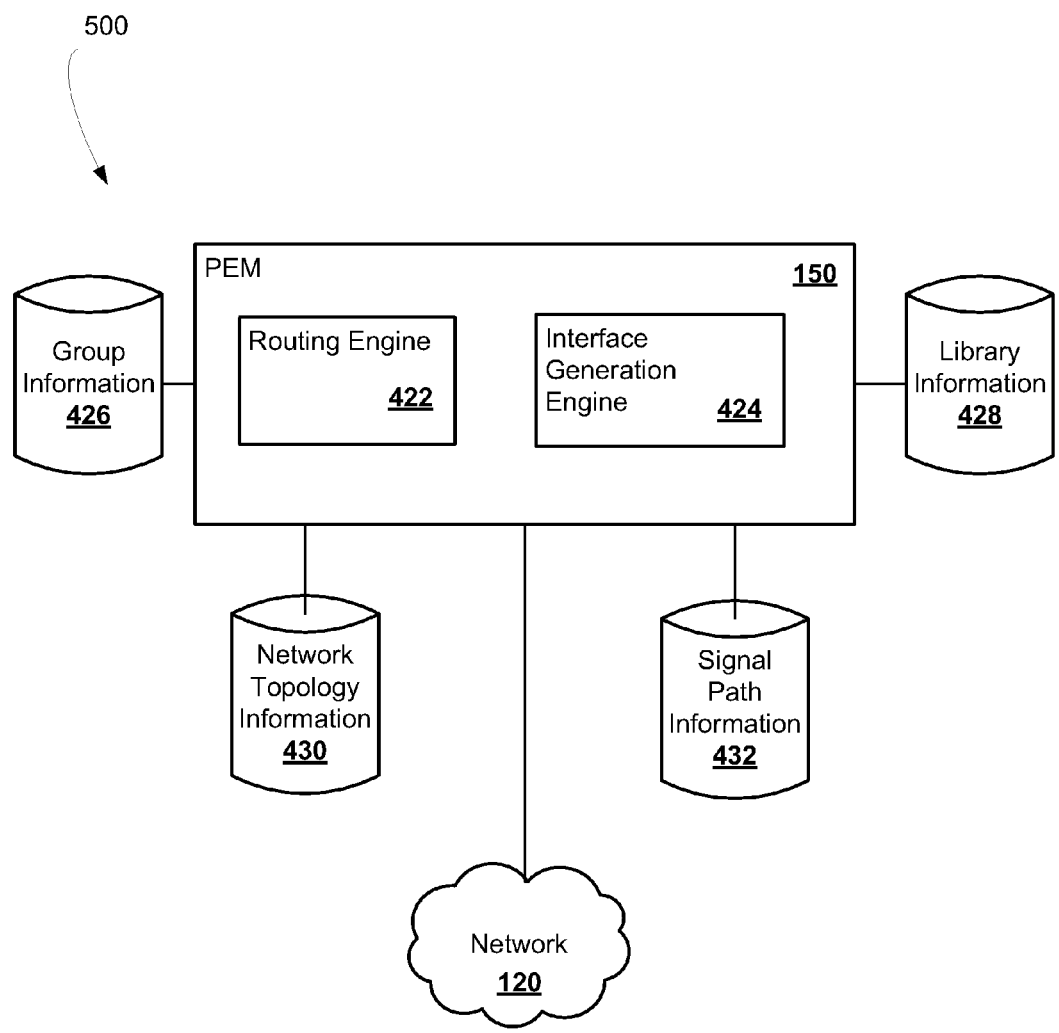
FIG. 5 is a high-level block diagram of an example system for routing and controlling AV-related devices—such as those depicted in FIGS. 1 through 3—based on groups.

FIG. 5 is a high-level block diagram of an example system 500 for routing and controlling AV-related devices—such as those depicted in FIGS. 1, 2, and 3—based on groups. The system may include the PEM 150. The PEM 150 may be in communication with the AV network 120. The PEM may include a routing engine 422, an interface generation engine 424, and the system 600 may include databases for: group information 406, library information 428, network topology information 430, and signal path information 432. For simplicity, information in these databases may simply be referred to "information." The databases 426, 428, 430, and 432 may be coupled with the PEM 150. Herein, the phrase "coupled with" is defined to mean directly connected to or indirectly connected through one or more intermediate components. Such intermediate components may include both hardware and software based components, including the network 120.

The routing engine 422 may include instructions executable to determine routes through the network 120 between devices based on the group information 426, the library information 428, and the network topology information 430. Alternatively or in addition, the routing engine 422 may determine routes based on just the group information 406. Alternatively or in addition, the routing engine 422 may determine routes based on just the group information 426 and the network topology information 430. In one example, upon determination of a particular signal path through the network 120, the routing engine 422 may optionally store the information about the path in the signal path information 432.

The interface generation engine 424 may include instructions executable to generate a user interface or panel to control devices associated with one or more groups or a device in a signal path to one or more devices in the groups. Alternatively or in addition, the interface generation engine 424 may determine parameters common to devices in a group.

The group information 426 may include mapping between groups and the devices stored in the corresponding groups. The group information 406 may also include a mapping between groups and channels of the AV-related devices. The group information 426 may include group hierarchy information as well, group names, or any other group information for the venue.

The library information 428 may include information about types of AV-related devices. For example, the library information 408 may include vendor names, device type, supported features, configurable parameters, channel formats, any other information about AV-related devices, or any combination thereof.

The network topology information 430 may include information related to physical and logical arrangement of devices on the network 120. For example, the network topology information 410 may indicate that an amplifier and a speaker are in a venue and that the amplifier drives the speaker with a stereo channel.

The signal path information 432 may include any information about routes through the network 120 that AV signals travel. For example, a path stored in the signal path information 432 may include identifiers of the devices that are on a particular path.

With further reference to the routing engine 422, routing of messages may be between components, such as objects, in the node structure of an AV-related device. In addition, messages may be routed between components in the node structures of different AV-related devices. Routing may be configured between virtual devices and/or objects. For routing between components in different AV-related devices, the components may be bound to one or more physical interfaces, which in turn may stream the AV to and from the AV network 120.

Routings may be constructed by configuring each component. Such configuration may involve uniquely identifying the source and destination of each routing. For example, a first component, such as a first object, may be configured to identify that inputs will be from an output of a second component, such as a second object, and that outputs of the first component will be provided to the input of the second component. Each component may have a number of channels. The channels may be identified by a predetermined identifier, such as a zero-based integer. The channels may be configured to be either an input or an output. The channel identifier may be combined with the AV system—or unique node ID—address of the AV-related device to form a unique AV address. For example, an AV-related device with an AV address of: 0xABCD00000001 may have a channel: 12 with an I/O Mode of Output.

The node ID address may be an output AV address or an input AV address. Thus, an AV-related device may have an input channel that can receive a node ID address to identify where the input channel should obtain its AV source. In addition, the AV-related device may have an output channel that can receive an input AV address—or unique node ID address—to identify where the output channel should route its output. For example:

Output Connection specifying an Input Address (First Object);

Audio Address: 0xABCD00000002, Channel: 2, I/O Mode: Input;

Input Connection specifying an Output Address (Second Object); and

Audio Address: 0xABCD00000001, Channel: 12, I/O Mode: Output.

Further with reference to the interface generation engine 424, a subscription is a mechanism that may be used to notify a control interface view and/or AV-related device when something has changed. Subscriptions may be based on a predetermined condition, such as 'on change' or 'periodic.' All metering may be handled through subscriptions. For example, a first control interface view subscribes to a SV. If that SV is changed by a second control interface view, the first control interface view is told of the new actual value of the SV. Notifications may be handled using a set message, such as a SVSet message. All subscription messages may automatically generate an immediate response, such as an actual value of a SV. The response may be immediate to synchronize the different control interface views to have the same value.

In the subscription message, the subscribee may be directed to use a specified virtual device, object, and state variable ID to report changes. From the point of view of the subscribee, when a change is reported to the subscriber, the SV on the subscriber is set to the new value as opposed to notifying the subscriber that the particular SV on the subscribee is changed. This mechanism is useful, for example, when the subscriber does not keep a full-mirrored data set of the subscribee. A subscriber that is a simple control surface, such as a wall controller, or a custom control interface, can have its own set of SVs with their own AV—or node ID—addresses. The subscribee may simply set these SVs directly without any translation required on the subscriber end. Accordingly, each SV may have a set of 0 to N audio/video addresses and state variable IDs that are mapped. When a SV has changed, a predetermined subscription list may be accessed by the subscribee, and a set message (such as SV_Set) may be transmitted to each of the subscribers on the subscription list that are mapped to the changed SV. To minimize network traffic, notifications may be bundled and sent to any one node using any one of the normal bundling techniques.

Each SV class may define whether a respective SV is to be considered a sensor or non-sensor SV. All sensor SVs may notify based on a predetermined condition, such as at a periodic rate. The periodic rate may be specified by the subscriber. If because of overhead the sensor cannot support at the rate suggested by the subscriber, the sensor may notify at a slower rate. The sensor may be configured not to notify at a faster rate than specified by the subscriber. The subscription message may include a rate that is used when the subscription is to a sensor SV. Non-sensor SVs may be automatically assigned to notify of change.

A subscription also may be based on a predetermined condition, such as an event subscription or a value subscription. A value subscription is a request to be notified of a new actual value of an SV when the actual value of the SV has been changed by a third party. For example, a value subscription may be used when multiple control interface views that need to stay in a coherent state attach to an AV-related device that is a mixer core. If a first control interface view engages a mute in the mixer core, a second control interface view may be notified with a value subscription to a SV that controls a mute indicator in the second control interface view.

An event subscription is a request to be notified of a SV's current value in response to a hardware trigger, such as the closing of a switch contact. A SV may support event subscription if the SV has input hardware associated with it. Event subscription capability may be indicated as part of the SV class declaration. An attempt to obtain an event subscription from an SV that does not support event subscriptions may be rejected with an error. Event and value subscriptions are not mutually exclusive. Both event and value subscriptions may be in force at the same time. Subscriptions also may be multi-level. With SV subscriptions, the subscription may be to a single SV or a list of SVs within one subscription request message. Object and virtual device subscriptions also may be to a single SV or multiple SVs. A subscription to an entire node also may be requested. A node subscription message, such as a SubscribeErrors message to subscribe to all of the errors generated by a node, may be directed to the virtual device node manager of the subscribee.

The subscriber also may request the subscription data message to be delivered to an alternative destination virtual device or object. The alternative destination also may include a 'mirrored' AV node structure. The mirrored AV node structure may allow AV-related devices, such as GUIs, control interfaces, or automation devices to subscribe to any other AV-related device without an address clash occurring between the components in the subscriber and subscribee.

In one example, an SV list on a subscriber object mirrors the SV list on the subscribee so that each individual SV ID need not be sent in the subscribe data message. Subscriptions to an entire object also may specify whether the subscription is to all sensor and non-sensor data, all sensors or all non-sensors. Subscriptions to a virtual device may be by addressing a subscription message to the virtual device. All of the SVs contained in the virtual device and every object encapsulated in the virtual device may be subscribed to. The virtual device structure of the subscriber may be identical to that of the subscribee. A subscription may be added or removed using add and remove messages. Multiple SVs also may be unsubscribed in a single unsubscribe set message, such as a SVUnSubscribeAll message.

Automated Routing/Configuration of Networked AV Devices

By providing a system in which the system designer may create logical zones before loading devices with configuration parameters, all or part of each of the following processes may be largely automated with regards to configuration of an AV system: (1) adding and organizing devices; (2) addressing devices; (3) grouping of devices for control; (4) system-wide routing of networked audio; (5) access control configuration; (6) speaker/system tuning; (7) room combining; (8) creation of custom control surfaces; (9) system troubleshooting; (10) tracing signal paths—both analog and digital; and (11) latency optimization. While specific potential examples of how a graphical user interface (GUI) may enable a user to configure an AV system are described here, it should be recognized that these are but exemplary and other means or methods may be used that vary from those disclosed.

A room of a building may be physically designed to include racks of AV-related devices that are then physically connected to each other and/or to the network 120. The cable for the network 120 may be run throughout the building to remotely-located devices, which are also physically connected back to the rack room. For instance, speaker wire may be also run throughout the building to connect amplifiers or other DSP devices of the rack room to the loudspeakers located in various output zones or rooms, although some AV-related devices besides loudspeakers may also be located in the output zones other than the rack room. The network 120 may be run to wall controllers that remotely control the outputs from AV-related devices 200 of the rack room that become the inputs to the loudspeakers (and/or other AV-related devices, if present).

Figure 6:
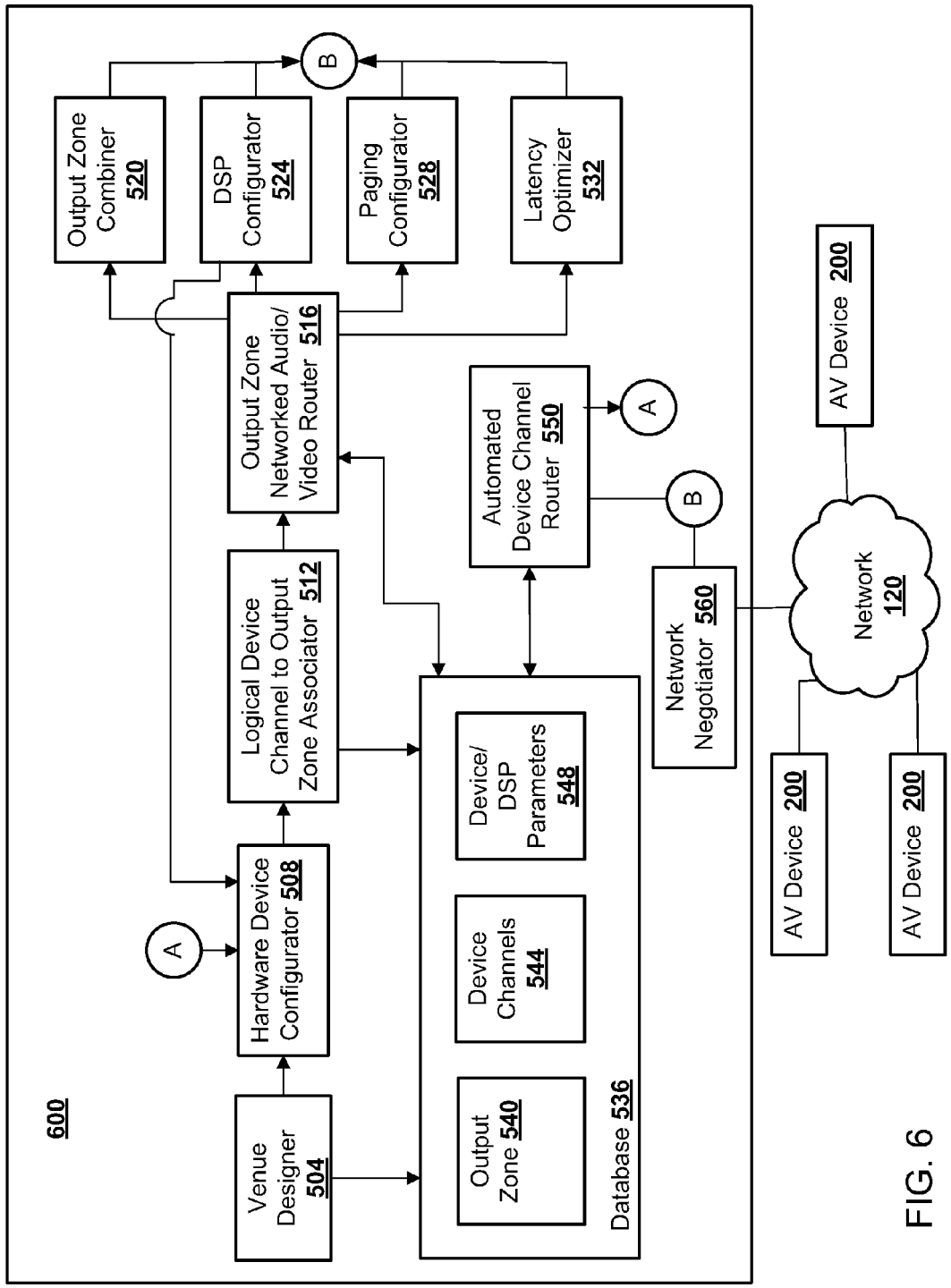
FIG. 6 is a block diagram of an example of a system for automatically routing networked AV according to output zone of a venue once pictorially configured by a user through a graphical user interface (GUI).
Figure 7:
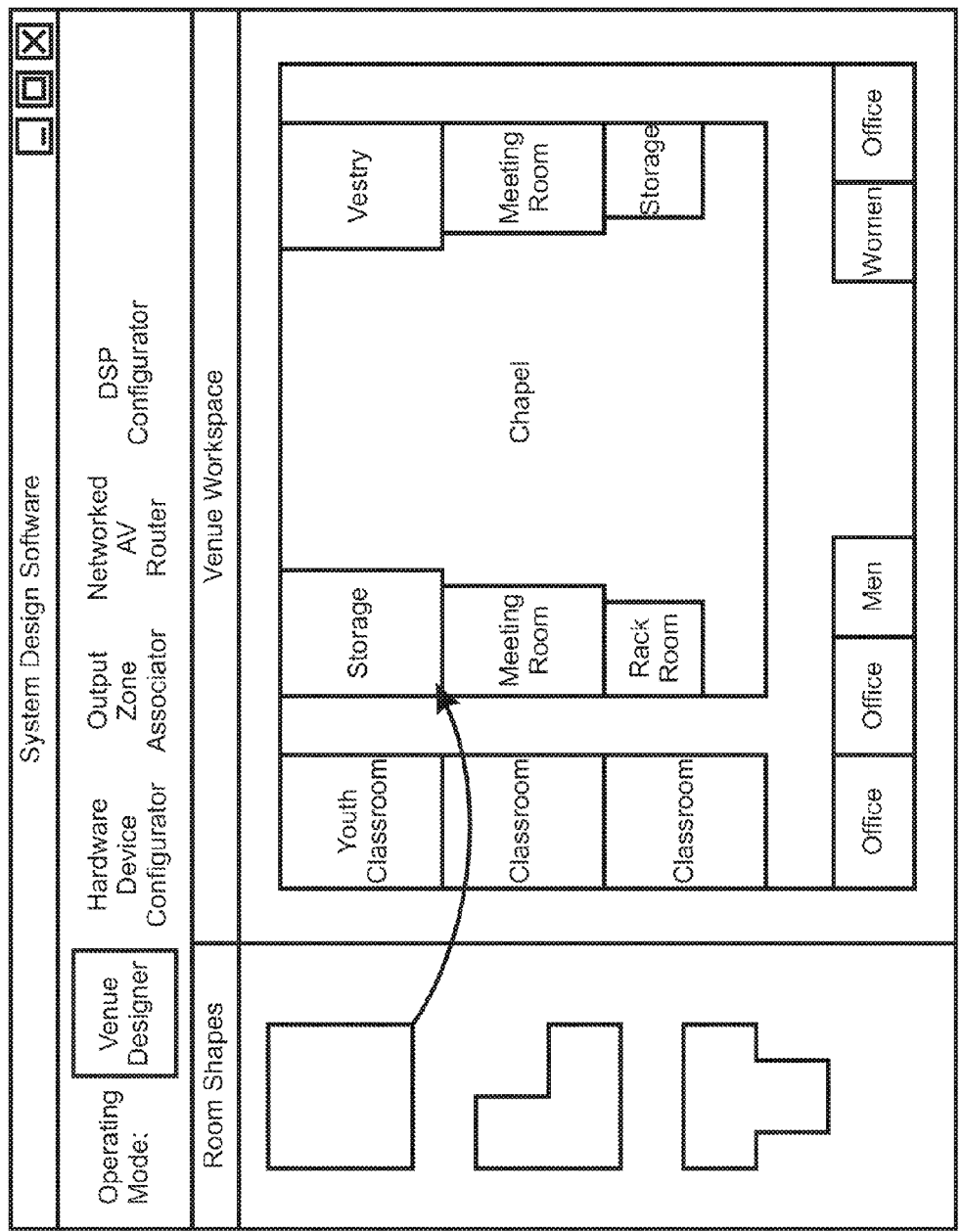
FIG. 7 is a screen shot of an example user interface that enables a user to pictorially build in software a geographical layout of a venue that represents the physical reality of the venue and that defines a number of output zones.

FIG. 6 is a block diagram of an example of a system 600 for automatically routing networked AV according to output zone once pictorially configured by a system designer or any other user through a graphical user interface (GUI). The system 600 may be a subset of the routing engine 422 disclosed with reference to FIG. 5, and thus include the functionality and capability of a performance equipment manager (PEM) as already discussed above. The output zones may include rooms, racks, common areas, or any other area or spaces within a building where AV devices may be grouped together for simultaneous control.

The system 600 may include a venue designer 504, a hardware device configurator 508, a logical device channel to output zone associator 512, an output zone networked AV router 516, an output zone combiner 520, a digital signal processor (DSP) configurator 524, a paging configurator 528, and a latency optimizer 532. The system 600 may further include a database 536 that includes output zones 540, device channels 544 of AV devices of a configured AV system, and device DSP parameters 548 stored in relation to each other where applicable. The output zone networked AV router 516 may gather the associations of the output zones to destination device channels, as well as selected source AV signals for those output zones, and direct this information, as required, to the output zone combiner 520, the DSP configurator 524, the paging configurator 528, and the latency optimizer 532. As shown, the DSP configurator 524 feeds back associations of DSP devices and/or components placed in association with AV devices or output zones of the venue to the hardware device configurator 508 so that the inserted DSP devices may be properly configured within the AV system, where placed.

The system 600 may further include an automated device channel router 550 that automatically routes AV device channels associated with an output zone to the proper output zone, as will be discussed later. The system may further include a network negotiator 560 to interface with and facilitate communication over the network 120 to couple components of the system 600 with the AV devices 200 over the network 120. These enumerated components of the system 600 may include functionality provided by integration with or execution through the configuration system discussed herein or any combination of software and hardware.

The database 536 may be stored in any kind of data storage in memory in which are saved the output zones 540 in relation to AV device channels 544 of a plurality of receiving AV devices. That is, the system 600 is configured to store one or more receiving AV device channels in the database 536 in relation to the output zone logically associated by the user, and automatically save one or more transmitting AV device channels—needed to supply a user-selected source AV signal—in relation to the associated output zone.

While discussing FIG. 6, reference will be made to the Venue View in an example graphical user interface (GUI) such as depicted in FIGS. 7 through 10 and 12. As will be explained in more detail, the user may create one or more groups of AV-related devices using the Venue View representation of the GUI. The groups may correspond to an output zone 540. Additionally or alternatively, the groups may be a logical grouping of AV-related devices, such as when the AV-related devices serve a common purpose. In one example, loudspeakers configured to produce sound in a particular portion of a room may be grouped into an output zone. In a second example, a video scaler located in one room is wired to a video monitor in another room, but the two devices may be logically grouped together as both operate to deliver and display one or more signals.

The Venue View may include a number of ribbon tabs that enable a system designer or any user to navigate the configuration system to configure the AV system and then interface with and edit the AV system after its creation. Pertinent to the present application is disclosed an Operating Mode (or other define venue) ribbon with a number of tabs related to modes or stages of design of an AV system. The tabs may lead a user through the stages of design of an AV system, which are connected to the modulated functionalities listed with reference to FIG. 6. These modes may include, but are not limited to: Venue Designer; Hardware Device Configurator; Output Zone Associator; Networked AV Router, and DSP Configurator, as shown in FIGS. 7-10 and 12. Each mode or stage brings up a separate, related page in which further configuration is executed depending on the connections and associations set up pictorially by the user within the user interface. Additional system functionalities may be associated with or added to the ribbon tab as necessary.

Venue Designer

In the Venue Designer 504 stage, the user may draw the lines or drop in and edit the geometrical shapes that will make up the output zones 540 so that they represent the actual layout of the venue, such as a building. Editing capability may be expansive to include, for example, editing the definition of floors, creation of rooms, editing of room properties, definition of buildings, and creation of zones. Many software tools may be available to further define the rooms, spaces, and zones of a venue building. The details of these tools and editing capability are disclosed in detail in U.S. Provisional Application No. 61/187,487. Furthermore, it may be possible to import a graphical representation of buildings as a background layer so that the user may superimpose rooms with the system drawing tools. It may also be possible to import other file types to assist with the definition of spaces.

The user may create logical zones that include rooms by selecting rooms and creating zones. In this way, rooms may be considered the basic physical building block from which logical zones are created. Alternatively or in addition, logical zones may be created within a room and thus represent the basic physical building block of any venue. Any one room may be part of multiple zones, which enables the serving of different functionality such as paging or public service announcements such as for evacuation, etc.

An alternate, Logical View (not shown) may be displayed to represent logical zones. A graphical representation is preferred but as a sole mechanism may become complex due to the requirement to display overlapping zones. Accordingly, a list or matrix view may be a sufficient alternative, and a combination of graphical and list/matrix views may be the most appropriate solution.

Hardware Device Configurator

Figure 8:
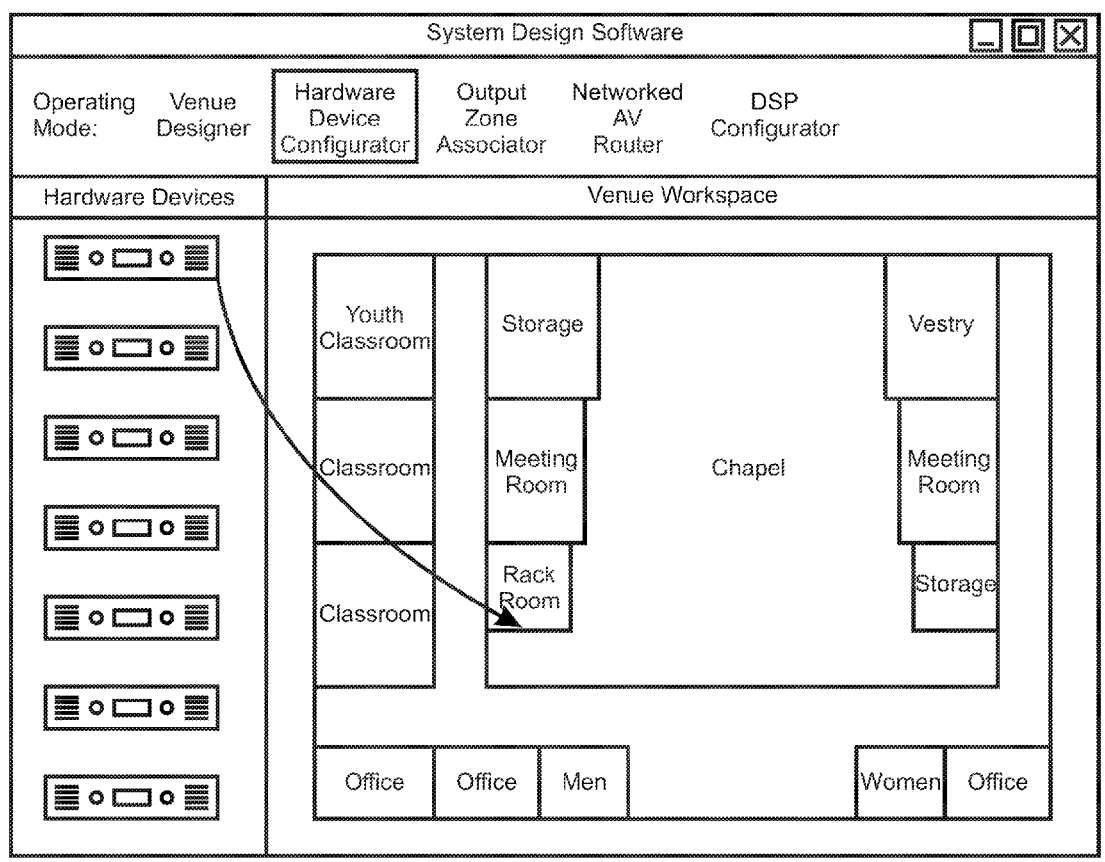
FIG. 8 is a screen shot of an example user interface that enables the user to place transmitting and receiving AV devices in the output zones of the geographical layout created in FIG. 6 that substantially represents physical locations thereof in the venue.

As a next stage of design, the design builder 504 may execute the Hardware Device Configurator 508, loading a page to enable the user to place any number of transmitting and receiving AV devices 200 where the AV devices physically belong within the output zones of the building, an example of which is shown in FIG. 8. The added devices may be discoverable over the network 120 to the venue. The placement of devices may represent active, physical devices such as often found in a rack room as well as passive devices such as loudspeakers often found in interior rooms of building or in other output zones. Once the AV devices are logically placed within the output zones where the AV devices substantially physically belong in the venue, the system may associate the unique node IDs of the AV devices with corresponding output zones in the GUI so that the system knows to which device it will be routing and configuring as will be explained later. This association may be stored in the database 536 as explained previously, with channel-specific associations stored in relation to the output zone in which are placed the devices.

The left-hand edge of the application in FIG. 8 may host a devices toolbox from which AV-related devices may be selected and added to the rooms/zones replicating their physical relationship within the venue such as a building. The devices may be dragged and dropped in, may be selected and then added through a mouse or selector action, and/or may otherwise be added to the rooms/zones.

The offline devices toolbox may contain a section for both discoverable AV devices and a section for passive devices selectable with the buttons at the bottom of the toolbox. For example, passive speakers may be added to the interface for the subsequent purpose of loading speaker tuning settings by wiring. Microphones, or other AV sources, may be also be added that may not be automatically discoverable on the network 120. Potential benefits to adding such AV sources include: having a fuller graphical representation of the system; if the analog signal path is known from the AV source, the concept of viewing an abstracted DSP directly at devices could extend to non-discoverable AV sources; and representation of non-discoverable AV sources may provide a source name for following signal names. Generic devices such as CD or DVD players may be added through Hardware Device Configurator.

The online devices toolbox may list devices discovered on the network and display discoverable AV addresses. In one example, both discoverable AV and protocol readdressing such as Internet Protocol (IP) readdressing may not be launched from this toolbox. Alternatively, this functionality may be invoked by direct selection of devices in the venue. In a different example, discoverable AV and IP readdressing may be launched from this toolbox. It may be possible to view online devices not yet loaded into the venue so that the user may easily and methodically add devices to the venue.

Once loaded into the venue, suitable devices may be combined into racks or other grouping of devices into a physical unit. This functionality may be available for a multiple selection of devices, either from a right-click context menu option, from a ribbon control, or both. Racks that make use of the Device Folder architecture may be visually displayed as racks. The rack may be named with standard mechanisms. Addresses and names may be displayed for each device within the rack. Devices may be renamed and readdressed individually within the rack without exploding it into a new view. Devices may be reordered within the rack without exploding it into a new view. Devices may be inserted into racks, either as a new, offline device or from elsewhere in the venue. A device may be inserted easily between two existing devices or at the top or bottom of the rack. Devices may be removed from racks, either deleted from the venue or moved to another location within the venue, including being directly inserted into a second rack.

Output Zone Associator

Figure 9:
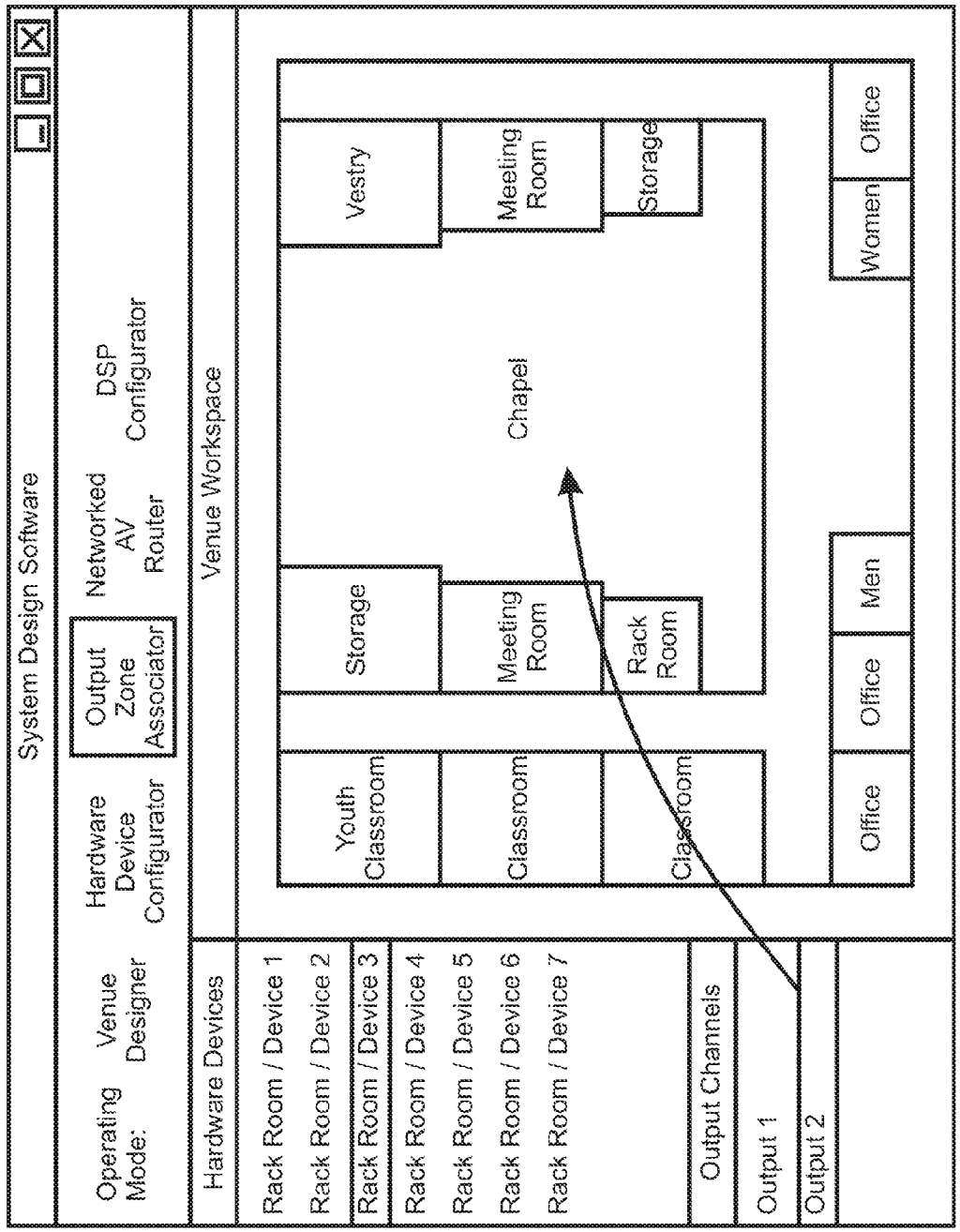
FIG. 9 is a screen shot of an example user interface that allows the user to logically associate AV device channels of one or more destination devices with one of the output zones of FIG. 6.

The logical device channel output zone associator 512 may also enable the user to logically associate one or more receiving AV device channels of one or more receiving AV devices 200 with an output zone, an example of which is shown in FIG. 9, which replicates a physical relationship of at least some of the receiving AV devices with loudspeakers or video monitoring devices in the associated output zone. The associator 512 may be integrated with the user interface to associate an output zone 540 in the database 536 as selected by the user with the receiving AV device channels 544.

The user may go to the Output Zone Associator page to interconnect the loudspeakers and otherwise associate receiving AV devices with output zone. By execution of the Output Zone Associator stage, the designer may move from the physical domain into the virtual domain by using the system to, for example: (1) associate amplifier output channels with loudspeakers; (2) associate analog connections from loudspeaker management devices to amplifier channels, and therefore with loudspeakers; and (3) automatically load speaker tuning settings into loudspeaker management/DSP devices or into DSP-capable amplifiers. With this information in place, the system may know the signal flow for each output zone (or room) and thereby be able to offer the user factory-supplied, task-based interfaces by automatically associating the controls for each with the correct devices. This will be discussed in more detail below.

The toolbox on the left may display, and allow for search of, physical amplifiers within the system that were added during the Hardware Device Configurator stage. A filterable and searchable text-based display may be oriented vertically, and allow for filtering or searching through amplifiers at room, rack, device, and channel levels. A zoomable and scrollable visual representation of individual rooms (not shown) containing appropriate devices may be employed. Amplifier output channels may be highlighted over the top of the amplifier icon. The amplifiers may optionally display output nodes as such, rather than divide themselves visually into catchment areas based on their number of outputs. In a second view, as shown in FIG. 9, a split screen may be used showing amplifier output channels that may be highlighted over the top of corresponding amplifier icons. The amplifiers need not show output nodes as such.

Regardless of how the device is represented in a toolbox, a first step may be to drag (or otherwise place) an individual amplifier output channel representation from an amplifier from the left-hand window onto a passive loudspeaker icon in the right-hand window, or directly onto an output zone within the venue (building) which itself is understood to contain loudspeakers. For loudspeakers that may be connected in series, the above steps may be skipped and a 'sticky' wire may continue from this first loudspeaker in the chain. The user may continue by clicking the sticky wire onto the next loudspeaker in the chain, from which he may be presented with another sticky wire output and so on. Once the user has completed the chain, and if appropriate, the system may load the correct speaker tuning settings into the corresponding amplifier. The user may desire to pick up the chain from the last speaker again. The user may do this by, for example, double-clicking the last speaker in the chain or selecting from a right-click menu.

From a user interface perspective, the operation of associating a DSP output channel with an amplifier channel may be completed similar to the procedure described above of associating an amplifier with a passive loudspeaker. The associations may be in the physical connection domain (analog/digital) at this stage of the system design. Alternatively or in addition, a DSP output channel may be associated with an amplifier channel where both the DSP and the amplifier are networked-controllable devices.

If the amplifier does not contain DSP, the speaker tuning settings may be loaded into the relevant output channel strip of a fixed-path device, or the necessary processing loaded automatically into a freely-configurable device. If the amplifier contains DSP, the speaker tuning settings may already have been loaded into the amplifier prior to the association of the processor output: at the point of associating a processor output with an amplifier channel, the application may prompt to ask for which device the processing for the speaker(s) may be done. DSP devices, as well as other intermediate AV devices, may be assigned a unique node ID and their tuning or other processing settings may be stored in SVs within each corresponding device. This information is tracked with the device as associated with the GUI so the system may include the DSP/processing devices in routing paths, as will be discussed in more detail later.

When connected to the network 120, the logical output channel block and wire representing the networked output of the processor channel to the amplifier input channel may be able to be monitored, with methods such as those discussed earlier. For example, the system may transmit a subscribe message to a selected device in the signal path requesting that the AV stream at the selected device be additionally streamed to a monitoring node.

Networked AV Router

Figure 10:
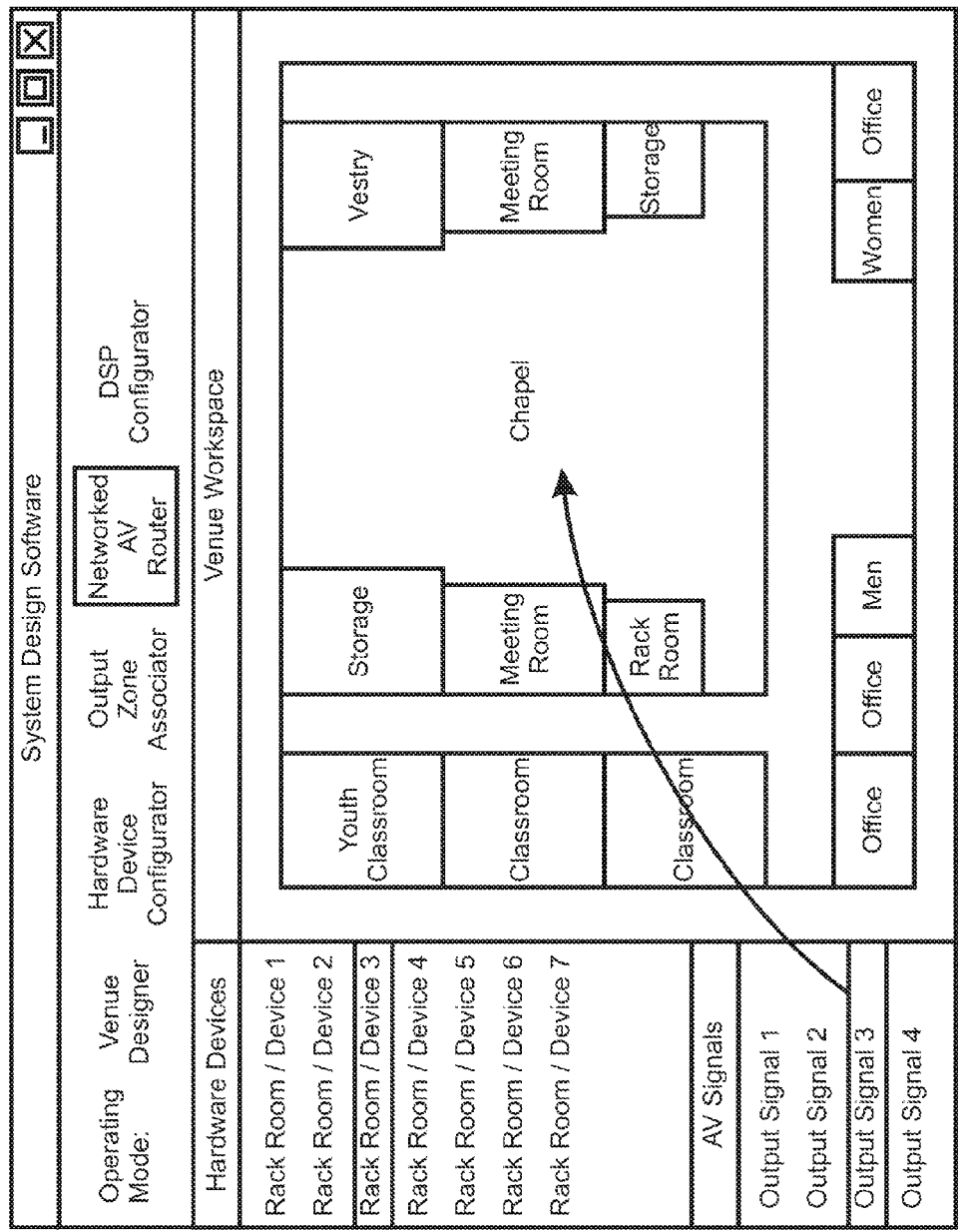
FIG. 10 is a screen shot of an example user interface that allows the user to select which of a plurality of source AV signals the user wants to route to the associated output zone of FIG. 8.

Furthermore, specific source AV signals may be available for user selection and association with specific output zones, an example of which is shown in FIG. 10. If the user selects the Networked AV Router tab, then the output zone networked AV router 516 of the system 600 may generate a user interface from which to base the routing of source AV signals to devices according to output zone created in the Venue View. In one example, the Networked AV Router tab may be replaced by a Route Signals button that facilitates routing of video signals, audio signals, or both. The AV signal may be transmitted using Ethernet AVB or some other protocol as previously listed now known or later discovered. Other examples are envisioned.

Once the user selects the source AV signal she wants to route to an output zone associated with the one or more receiving AV device channels, then the automated device channel router 550 will take the logical association of output device channels 544 with output zone 540, and automatically complete the routing of the source AV signal over the network 120 according to the receiving AV device channels associated with the output zone. The automated device channel router 550 may send the association of the output device channels by output zone to the hardware device configurator 508, which configures, over the network 120, the physical AV devices 200 involved in the logical associations made by the user or other devices used to monitor or control source AV signals.

The output zone networked AV router 516 may then pass the associations between the output AV device channels 544 according to the output zone 540, the source AV signal to be routed, and the hardware device configurations to the output zone combiner 520, the DSP configurator 524, the paging configurator 528, or the latency optimizer 532 for these respective engines to perform their functions as described in detail later.

With further reference to the output zone networked AV router 516, the Networked AV Router stage of the system design may include routing signals of networked AV device sources to output zones. Here, sources may include both mixed outputs from intermediate AV devices such as consoles, processors, etc., and discrete sources from intermediate and transmitting AV devices such as wall pates, I/O devices, processors, and microphones, etc. Furthermore, output zones 540 may be further defined by the logical amplifier/physical powered loudspeaker inputs channels, as configured in the Hardware Device Configurator stage and associations made in the Output Zone Associator stage. Routing in the Networked AV Router stage may be considered to be logical routing.

More specifically, in various examples, routing may be executed by sending messages between associated devices such as the "get," the "set," or the "subscribe" messages discussed earlier. The associated receiving AV device channels may have associated therewith a unique node ID that will be linked through data storage, such as the database 536, to the output zone selected by the user and for which addressing is executed, either randomly or sequentially as discussed earlier. Once the user selects one or more source AV signals for association with an output zone, the system may store the source AV signal(s) information to the associated output zone. The source AV signal(s) information may include, but is not limited to, the unique node ID address of the transmitting AV devices from which the source AV signal(s) originate and other signal-specific information, such as device name, signal name, and a numerical position of a given signal within a list of output sources of the receiving AV devices.

While the routing may, therefore, be executed in various ways depending on the network control protocol in which the system operates, one example may employ the BLOCK data storage structure discussed earlier for messaging. In addition, or alternatively, the system may employ a STRING data storage structure. The data storage structure may store any sort of data required for defining SVs and other route-related parameters as BLOCK (or data) values. When received by an AV device, the data structure may be parsed and its data values assigned to corresponding parameters or SVs in the AV device. As discussed, the SVs may then announce over the network to any subscribers that the SVs have changed.

The user selection of source AV signal(s) for association with an output zone may cause one or two processes two occur. The first process occurs if no previous source AV signal has been selected in the user interface for the output zone. The output zone networked AV router 516 of the system 600 may create two data storage structures, one to store the configuration data object for the source AV signal and another for the receiving AV device channels. The second process occurs if any source AV signal(s) had been previously selected for the output zone and another and different source AV signal is then selected. In this case, the system 600 may send a null (or empty) BLOCK data storage structure to the receiving AV devices to tear down the channel routing associated therewith. The effect is to empty out the memory locations of state variables and/or other attributes or parameters. Once the channel tear down is complete, the first process may then be executed to build the network routing of the newly associated source AV signal to the receiving AV device channels.

The automated device channel router 550 may then send the BLOCK data storage structure that were created for the receiving AV device channels to the associated receiving AV device channels. The corresponding receiving AV devices may parse or unpack the data storage structures to extract all of the data values needed to populate objects and state variables (AV) within the receiving AV devices. These associated receiving AV devices will then configure themselves according to these new data values. Additionally, the transmitting AV devices may receive the data storage structure containing the data object for the source AV signal having signal-specific and routing information. The transmitting AV devices may parse this data storage structure to determine the signal-specific and routing information needed to properly route the source AV signal to the receiving AV device channels. Other ways of messaging such network control protocol data are envisioned.

In terms of user interface layout, the left-hand pane of the application may feature a toolbox oriented vertically. The toolbox may be divided into two or three sections that are resizable vertically, may be collapsible and expandable, and may represent rooms, devices, and signals. A listing of output zones/rooms may be limited to output zones containing devices with networked AV device sources. Alternatively, or in addition, available rooms may be listed. A search dialog may enable searching for rooms containing devices with networked AV device sources (discrete and mixed).

A listing of devices may be limited to devices having networked AV sources. Alternatively or in addition, available transmitting AV devices may be listed in a Hardware Devices window. The list of devices may be filtered by the output zone selection to display devices in that output zone. For instance, the AV devices listed in FIG. 10 are those associated with the rack room. If no output zone entry exists, the list may display all devices with networked AV sources in the system 600. A search dialog (not shown) may enable searching for devices containing devices with networked AV sources (discrete and mixed). This search, for example, may take effect on the devices displayed in the list brought up in the devices section according to their name and ID, in which the selected output zone filter takes precedence over other filters. Devices may be listed and/or sorted by address or name.

The system 600 may limit a list of sources to networked AV device sources. The list of signals may be filtered by the device selection as discussed above to display only the networked AV output signals of that device. If no device selection exists, the list may display networked AV output signals of the networked AV devices in the selected output zone. If no output zone selection exists, the list may display networked AV output signals of the networked AV devices in the system. A search dialog or other search box may receive user queries, to facilitate searching for signal names.

With regards to operation of the Networked AV Router stage, the user may drag (or otherwise add) a selected signal from the AV Signals toolbox to the venue. Where appropriate, devices, and rooms may highlight as the signal is dragged across them to indicate that the signal may be dropped. Examples of inappropriate conditions may include that the room does not have network AV devices associated with it, e.g., that the device is non-Ethernet AVB, does not have Ethernet AVB inputs, or does not support another supported control protocol. Releasing the mouse button over a device or output zone, for instance, may confirm the destination for the dragged signal, although subsequent operation may differ for device or output zone as described below.

The routing of devices within the user interface of the GUI may further be executed by the output zone networked AV router 516 as follows. Routing to a compatible device with a fixed number of input channels may display a pop-up menu of the available networked AV channels on releasing the mouse button from which the user may select an available channel slot. Used channels may display the name of the signal assigned in channel slots which are already taken. A routing editor may be accessed from the right-click menu of such devices which may enable the user to move signals from one slot to another, if required. Other examples are envisioned.

Routing to a device with a flexible number of input channels (for example, consoles) may not present a list of available channel slots, but instead make the signal available in the device plugin design environment, or patch editor on the console hardware. A multiple selection of signals routed to a device may attempt to patch signals within the selection starting at a user-selectable available channel within the device. This may enable quick configuration of routing all stagebox output signals directly to console input channels. If existing channel assignments prevent the new assignment, then the user may be prompted to overwrite existing assignments, to use the next available empty channels and/or to cancel the operation. If more signals exist within the multiple selection than there are input channels available on the device, the operation may not be possible and the user alerted as to such. In a different example, a best fit algorithm may be used to complete the operation.

Routing to Output Zones

Routing to an output zone may in practice configure a possible routing condition of the networked AV signal to the appropriate input channels of the amplifier(s) serving the space, or correctly configure the DSP device responsible for speaker processing, if present. This routing may be executed by the automated device channel router 550 and may rely on the definitions carried out in the Hardware Device Configurator and Output Zone Associator stages of the design. When the first signal is dropped onto—or otherwise affiliated with—an output zone, a combo box may be placed within the space. The combo box lists the signals as they are added to the output zone. The combo box may be a subtle design in that additional signals dropped into the output zone are added to the combo box, enabling real-time routing switching. Additionally, a signal may be dropped on a multiple selection of output zones and, in this instance, is added to the individual combo boxes of all output zones in the selection.

Multiple selection of signals may be possible, which may add multiple instances of various signals to a common destination. When a device having mixed signals is included in the system design, it may be possible to suggest that the signals are mixed, automatically doing so in the device, and providing a default panel to control the relative levels of this mix. For example, the signal on an output channel may be a mixture of background music ("BGM") and an additional source. The corresponding default interface may include a volume control and a mute for each of the two sources on that channel.

Dragging a suitable room containing physical networked AV output devices into the AV Signals part of the GUI may filter the signals automatically by that room. When online, the Networked AV signal present in any room may be Networked AV monitored. In one implementation, this stage is solely a design phase. In a second implementation, this stage routes the source channel or channels in real-time by communicating with the devices on the network.

Routing to Multiple Output Zones

The multiple zone routing mechanism may be similar to that employed by drag-and-drop routing to individual output zones as follows. When the first signal is dropped onto a selection of multiple output zones, a combo box (not shown) is placed within the corresponding space. The combo box lists the signals as they are added to the room, in the space, or a combination thereof. Additional signals dropped into the selection of multiple output zones may be added to the combo box, enabling real-time routing switching by the automated device channel router 550. A signal may be dropped on a multiple selection output zones and in this instance it is added to the individual combo boxes of the rooms, and/or zones in the selection.

Multiple-selection of signals may be possible. For instance, dragging and dropping the multiple-selection of signals may add multiple instances to the multiple selection of output zones. When audio devices are included in the system design, it may be possible to suggest that these signals are mixed, automatically doing so in an AV-related device, and providing a default interface to control the relative levels of this mix. When online, the network AV signal present in any individual output zone may be networked AV monitored.

Routing Presets

The combo boxes that may be used to select sources for output zones facilitate real-time control of the signal being received by each. More complex routing configurations may be possible using presets, which also facilitate automatic routing as per output zone or zones, as previously discussed and further detailed below. A preset is a snapshot of state variables (SVs) for a given AV hardware device such as a receiving AV device. As such, a preset is a snapshot of the hardware configuration for an AV device, something that may be reflected in a control interface or other control panel.

The user may select a preset for a particular area of the Venue to route a source AV signal to that area. If the user deselects the preset, then the default routing for the area or areas within that area is reapplied. The preset feature may be useful to, for example, temporarily play an emergency message to a portion of or to an entire stadium, as is further discussed later with reference to paging.

A routing preset may be inherited from the combo box lists. More specifically, a user may create a preset with reference to a default panel and a specific output zone. The panel then associates SVs for parameters the user would like to control, and automatically associates at least the volume control and mute (or output gain), with the receiving AV channels of amplifiers in the output zone, for instance. The system may then associate, for example, a gain of 8 dB for a microphone signal selected by the user. This microphone may be used for emergency messaging to the associated output zone. The user may later load the preset for quickly routing the microphone signal to all of the rooms or spaces of the associated output zone, despite the fact that those rooms or spaces may be receiving other source AV signals as a part of different output zones. Another example of a preset is to associate the microphone signal of a pulpit in a house of worship with the amplifier channels in a chapel. The preset may be automatically loaded when that microphone is activated, and thus interrupt background music that may be playing through those amplifiers to the speakers of the chapel. The presets, as discussed earlier with the automated networked routing, may be stored in the amplifiers associated with specific output channels and the system 600 may also communicate the presets throughout the network 120 to other devices that may be a part of the preset devices path, such as to DSP devices.

In FIG. 9, multiple signal partners may be handled together based on knowledge of the transmitting AV device and the receiving AV device. For example, channels may be grouped together as a stereo channel group, a surround sound channel group, or any other group of individual channels that may be routed together. In Ethernet AVB, for example, the channel group may have a format (stereo, 5.1 surround, etc.) and the transmitting and receiving AV devices that have channel groups may be assigned the format on a per channel or per channel group basis. If the format of source and destinations is equal, signal paths may be closed; if not, the user may be prompted for format mapping information. For example, the user may be prompted for whether the system should connect left leg only, mono-sum, upmix to 5.1, and the like. Alternatively, the connection follows a preference set for the particular device, which, e.g., inserts an upmix process when a mono signal is assigned to a stereo destination.

Figure 11:
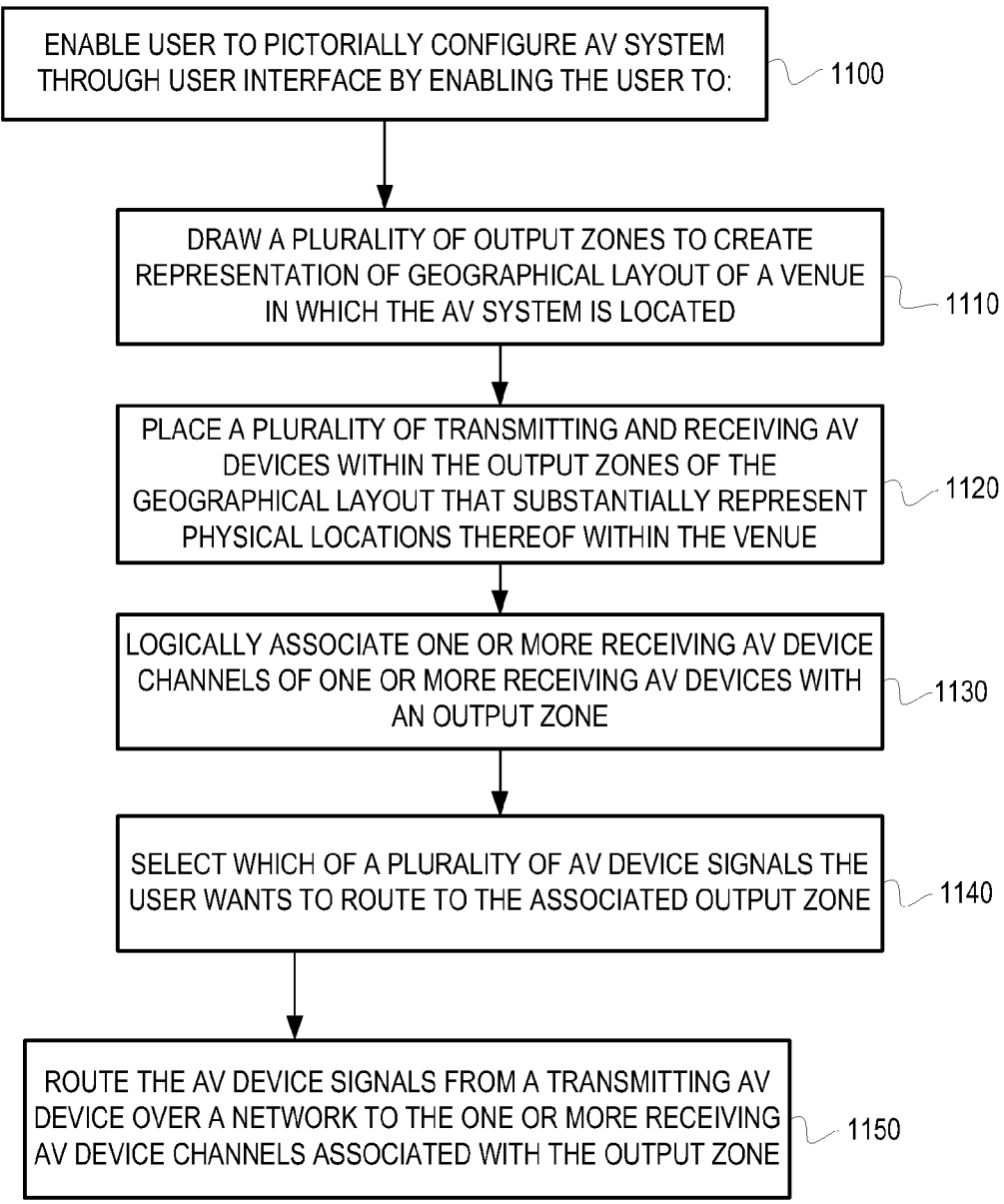
FIG. 11 is a flow chart of an example method for automated routing of networked AV according to an output zone, using a group of AV devices logically associated with that output zone.

FIG. 11 is a flow chart of an example method for automatic routing of networked AV according to an output zone. The example method is executable on a computing device having a processor and memory, and includes, at block 1100, enabling a user, with a user interface of the computing device on which are executed instructions for configuration of the AV system, to configure the AV system by enabling the user to do the steps at blocks 1110 through 1140. At block 1110, the user is enabled to draw a plurality of output zones to create a representation of the geographical layout of a venue in which the AV system is located. At block 1120, the user is enabled to place a plurality of transmitting and receiving AV devices within the output zones of the geographical layout that substantially represent physical locations thereof within the venue. At block 1130, the user is enabled to logically associate one or more receiving AV device channels of one or more receiving AV devices with an output zone that replicates a physical relationship of at least some of the receiving AV devices with loudspeakers in the output zone. At block 1140, the user is enabled to select which of a plurality of source AV signals the user wants to route to the associated output zone.

At block 1150, after completion of the steps at blocks 1110 through 1140, the computing device automatically routes the source AV signals from one or more transmitting AV devices over a network to the one or more receiving AV devices associated with the output zone, such that operation of the one or more receiving AV devices is driven according to the output zone as configured by the user. The computing device may also automatically control the one or more transmitting AV devices in response to the grouped association of the one or more receiving AV devices according to output zone, to thereby automatically route the source AV signal to the one or more receiving AV devices. Examples of transmitting AV devices may include a microphone, an audio digital signal processing (DSP) device, and an on-ramp AV device, and examples of the receiving AV devices may include an audio amplifier, a loudspeaker, a DSP device, and an off-ramp AV device, for instance. Many other examples are envisioned.

Adding/Removing DSP Directly in the Venue

Figure 12:
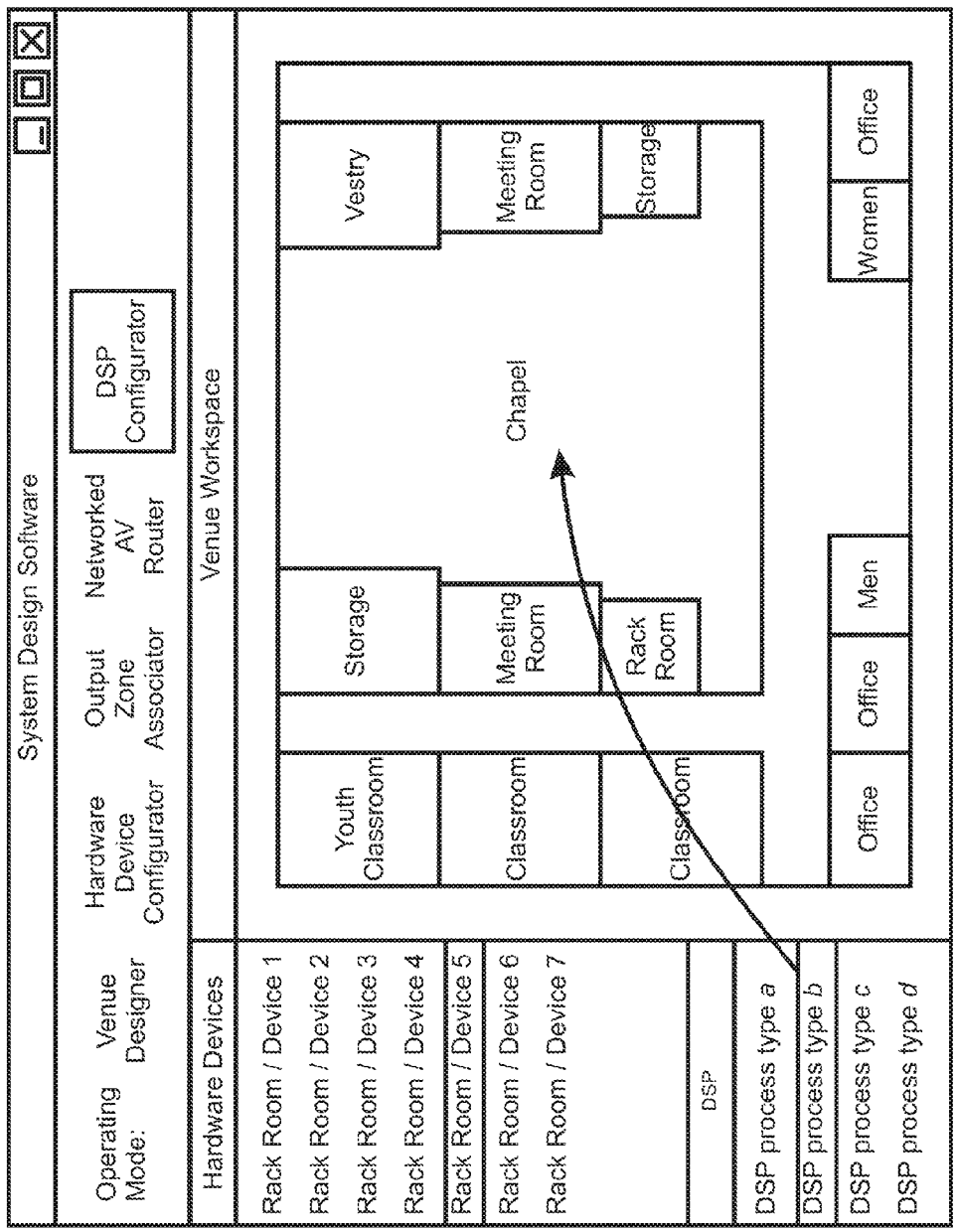
FIG. 12 is a screen shot of an example user interface that allows a user to insert or remove any number of digital signal processing (DSP) devices or processes by intercepting a transmitted network signal path between transmitting and receiving AV devices on the same network, and re-routing the signal path through the DSP devices or processes.

In addition the automatic routing of the source AV signal as discussed above, the system 600 also enable the selective addition of digital signal processing (DSP) components to the transmitting or receiving AV devices in real time, and likewise, the removal of selective DSP components from the transmitting or receiving AV devices. The DSP configurator 524 enables the user to pictorially add, through the user interface, one or more DSP devices to be placed, where desired, in-line with a transmitting or a receiving AV device, an example of which is depicted in FIG. 12. The DSP configurator 524 also enables the user to remove a DSP device that has been placed in-line with a transmitting or a receiving AV device. As shown in FIG. 12, the hardware devices are selectable in a left window pane, which in the example of FIG. 12, are located in the rack room. When selected, the digital processing types of DSP components that are available with the selected device are displayed in another window.

In response to the addition of the DSP device to the venue, the system 600 automatically re-routes the source AV signal through the one or more DSP devices before or after passage through the transmitting or receiving AV device, to add selected signal processing capabilities to the source AV signal. In response to the removal of one or more DSP devices, the computing device automatically re-routes the source AV signal to bypass the removed one or more DSP devices before or after passage through the source or receiving AV device, to remove selected digital signal processing capabilities from the source AV channel.

The automatic re-routing in response to the addition or removal of DSP devices to an AV device in an output zone may be performed using the same method discussed earlier with regards to the networked AV routing. For instance, the system 600 may detect the combination of output zones, may tear down channel routing to some devices, as required, and may generate BLOCK or STRING data storage structures for messaging affected AV devices about the changes in routing parameters, SVs, and attributes. Other messaging and configuring protocols are envisioned.

The added or removed DSP devices may include freely-configurable DSP devices capable of being configured to replicate one or more processing components. In this example, in response to the addition of a processing component to the output zone by the user, the system 600 may automatically add a DSP device to the system, configure the DSP device with logic to form the processing component, and re-routes the source AV signal through the processing component before being fed to the receiving AV device(s).

For fixed path AV devices, knowing the device path of the connections of networked AV input devices to DSP/console channel strips and the device paths employed for loudspeaker processing, it may be possible to present the input and output processing icons directly at the transmitting AV devices and loudspeakers in the venue. From these icons it may be possible to launch the individual processing block interfaces, abstracting the processing from the hardware devices and placing it more logically into the system design. That is, as far as the user is concerned, discrete DSP components are placed in the venue by output zone or hardware device, such as affiliated with an amplifier or a room. For fixed signal path devices, the icons for the entire input or output processing channel strips may be represented. These processing strips may be able to be expanded out from or collapsed into the device in a sensible left-right representation of signal flow: speaker processing to the left of the device and input device processing to the right of the device.

Master Control Interfaces may be set up and used to link the processing for multiple speaker inputs together. For example, with Windows Presentation Foundation (WPF) device panels, the processing block icons could be lifted straight from the panels and may therefore act as aliases and/or shortcuts.

Examples of a signal processing device include an equalizer, a Compressor/De-Compressor/Limiter, and Soundweb™ London from BSS Audio of Sandy, Utah. Having the networked AV input and output devices displayed directly in the venue, it may be possible to insert one or more signal processing devices in-line at the output of on-ramp devices and at the input of off-ramp devices. In this way, systems may be designed without the designer manually configuring the signal processing device and or devices, further abstracting the processing from the hardware devices and placing it more logically into the system design. The network 120 may automatically be configured to take the signal and route it through the signal processing device, processing it as appropriate.

As with fixed signal paths, signal processing blocks may, in one example, be expanded out or collapsed into the device in a sensible left-right representation of signal flow as already discussed. For example, processing may be placed between loudspeaker management devices and amplifiers, if the corresponding devices are connected in such a fashion in the venue. In one example, double-clicking an icon of the DSP in the design may reuse the design space and open a full device design environment specific to the DSP device. If the device design environment is opened in the Networked AV Router page, then networked AV Signals may be dropped directly into the audio device.

In terms of the layout, when adding or deleting DSP devices from the Venue View, a left-hand pane may be used for dragging of a signal processing device into the venue or otherwise selecting the signal processing device for insertion therein. A user may see the processing strips in the venue view in any stage of the design in one example. Alternatively or in addition, the user may see the processing strips in one mode. The user may be able to expand and/or contract the displayed processing strip. The processing panels may be presented differently in different implementations.

Figure 16:
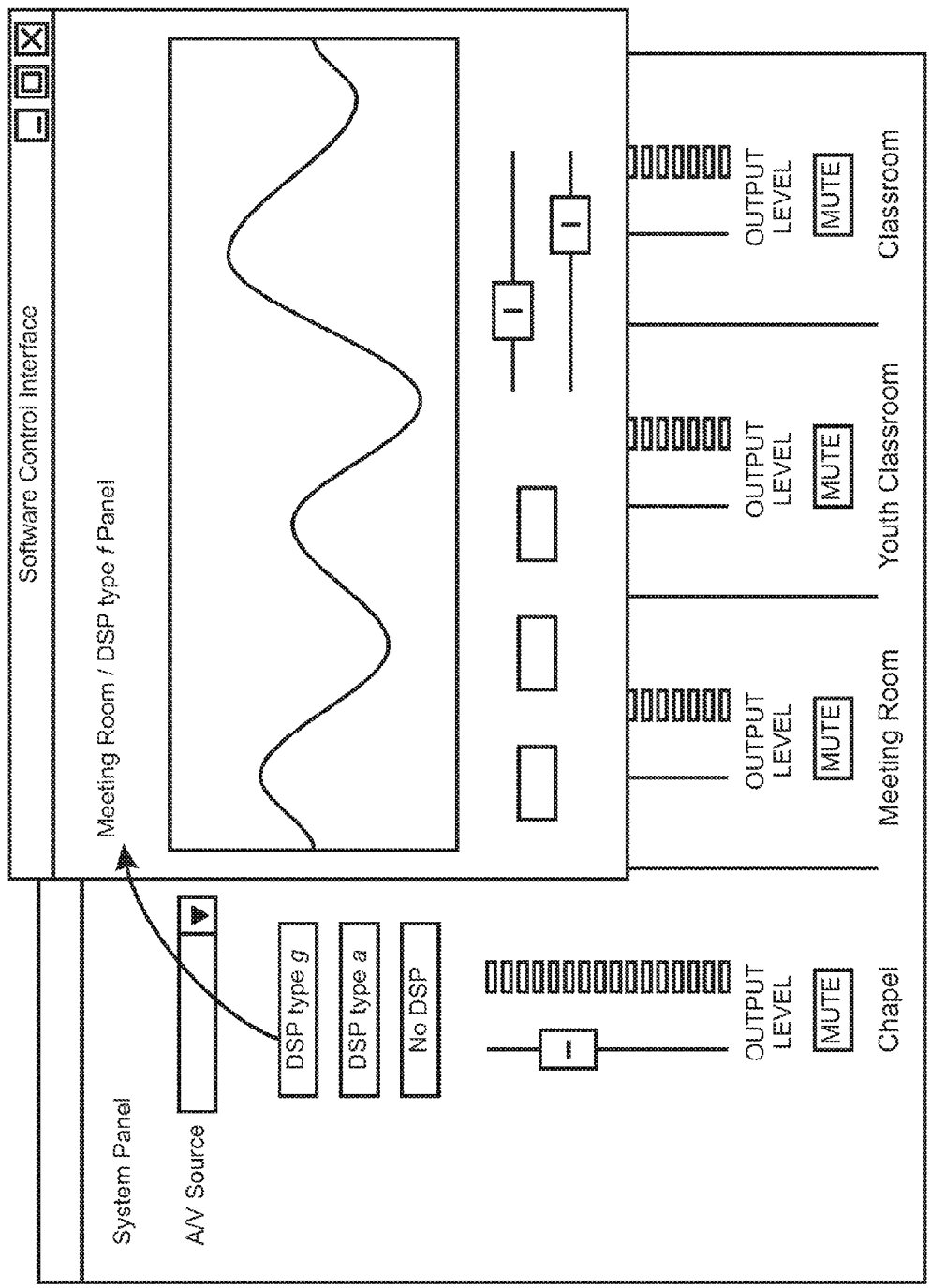
FIG. 16 is a screen shot of the example system mixer panel of FIG. 14 with a pop-up screen showing the signal from a selected DSP component type of a corresponding output zone.

For example, it may be possible to use the lower area of the screen to present a mini version of the panel on a single click of the processing block in the venue above. In another example, double-clicking an icon representing a processing block may launch floating panels. Floating windows may be forced instead of reusing the same venue window to display the processing block (FIG. 16).

Output Zone Combining

With the approach of system design system generation being to consider venue by physical rooms, the practice of output zone (or room) combining in a networked AV system may be simplified dramatically, as executed by the output zone combiner 520 which is integrated with the user interface or GUI. An Output Zone Combiner tab may be added to the Venue Designer tab or as a separate tab in the Venue View. Combining output zones may result in source AV signal(s) associated with an output zone to be sent simultaneously to all combined output zones.

With the building view in a control mode, the output zone combiner 520 may automatically place icons within combinable spaces to indicate that two adjacent spaces are combinable, the "flow" of the combination, e.g., which space may adopt the signal currently routed to the master space, that spaces are combined, and which space is control "master" and which are control "slaves" for adoption of source control, level, mute, and the like. Output zone combining may or may not be restricted to adjacent spaces or rooms. Therefore, if not restricted to adjacent spaces, the system may enable the configuration of overflow rooms, or other spaces not adjacent to each other. In one example, output zone combining may be included as a system behavior. Alternatively or in addition, output zone combining may be configured during the Venue Designer stage.

With the information available to the user as discussed above, the output zone combiner 520 of the system 600 may enable the user to combine output zones for simultaneous control by enabling the user to select two or more output zones to combine through the user interface, where the user interface may or may not indicate the two or more output zones are combinable. The system 600 may then automatically create logical groups, over the network 120, the audio device channels of the two or more receiving AV devices in the selected two or more output zones such that they will be controlled as a group. The system 600 may further enable the user to control the audio device channels of the receiving AV devices logically associated with the two or more output zones as a group through the user interface of the computing device. In other words, for the two or more receiving AV devices, at least one each corresponding to each output zone, the system 600 automatically links the AV routing of one or more receiving AV device signal input sources, and thus the routing of the source AV signal from transmitting AV devices.

Automatic linking of the AV routing of source AV signal(s) to the receiving AV device signal input sources may be performed using the same method discussed earlier with regards to the networked AV routing. For instance, the system 600 may detect the combination of output zones, may tear down channel routing to some devices, as required, and may generate BLOCK or STRING data storage structures for messaging affected AV devices about the changes in routing parameters, SVs, and attributes. A new preset configuration may be saved by the user for later use to automatically execute the room combining. Additionally, the preset may include a preset source AV signal for purposes of paging as discussed in more detail in other sections.

Figure 15:
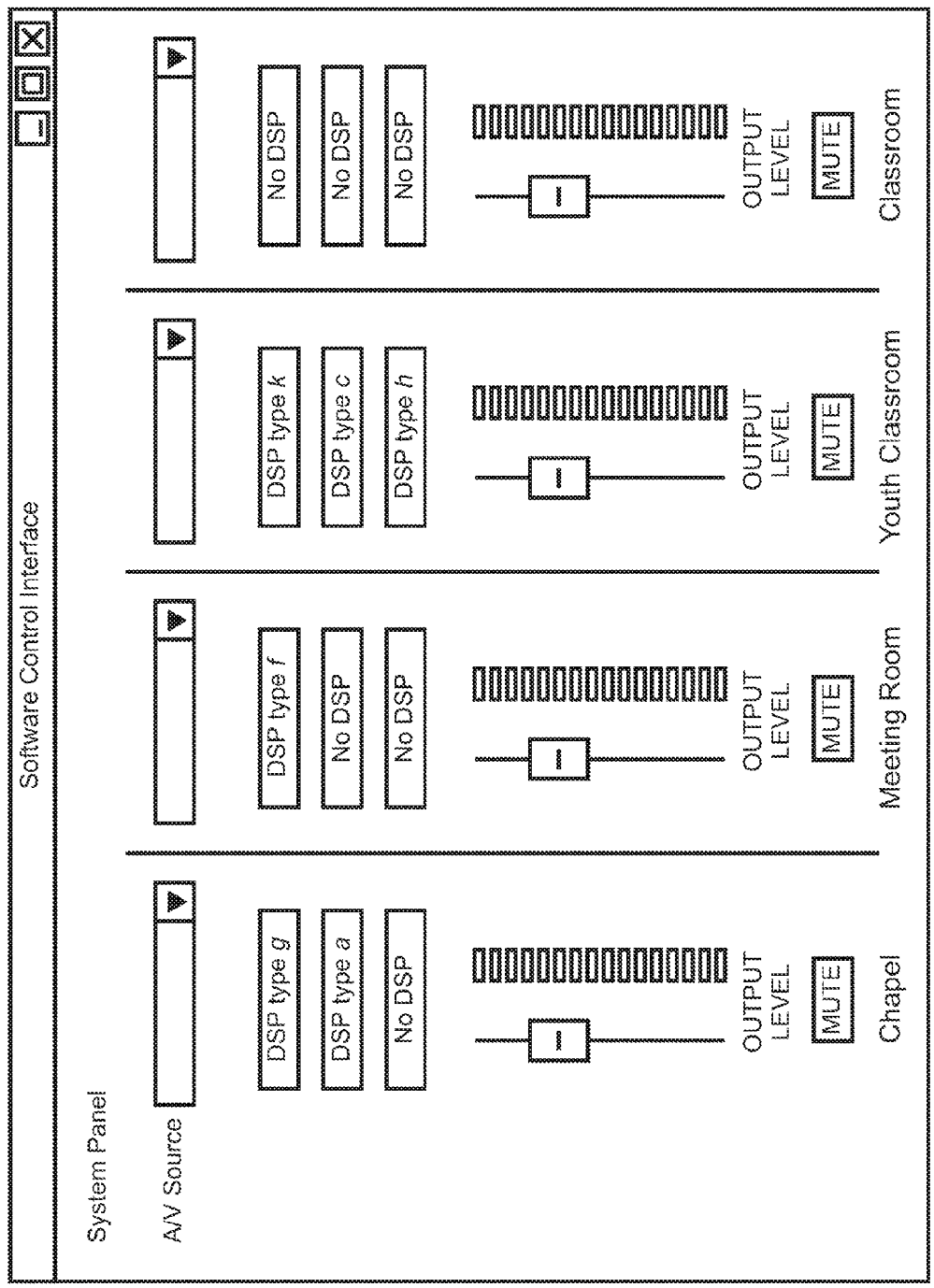
FIG. 15 is a screen shot of an example system mixer panel automatically programmed according to the system of FIG. 12 for a plurality of output zones.

One example of a user interface generated by the system 600 for simultaneous control of the linked AV signal input sources is shown in FIG. 15. For instance, the two or more receiving AV devices may include amplifiers that feed Classroom 1, after combination with Classroom 2, where the computing device automatically groups one or more receiving AV device channels of the amplifiers associated with Classrooms 1 and 2 after being combined in the GUI by the user. Control of the combined signal going to both classrooms may then be represented in a control interface as "Classroom," as shown in FIG. 15.

The output zone combiner 520 also enables the reverse of room combining, enabling the user to separate the two or more output zones through the user interface to reverse the simultaneous control of the two more output zones. The system 600 would then automatically segregate the audio device channels of the two or more receiving AV devices such that they will be controlled separately over the network, thereby also segregating the AV routing of one or more receiving source AV signal input sources.

Latency Optimizing

The ribbon tab may further include functionalities to: optimize networked AV latency; map the network; and diagnose the network, none of which are shown. The latency optimizer 532 may also be executed by the system 600 automatically, based on the configuration of the AV system by the user in the GUI.

Networked AV technology such as Ethernet AVB or another networked protocol, now known or later discovered, may enable multiple simultaneous latency optimizations across the configured AV system. This is because some networks 120 include multiple simultaneous AV data path latencies to AV devices on the network 120. Such latencies may produce an echo when routed to destination devices that may be heard simultaneously. For instance, audio from a chapel may be heard in a nearby classroom along with audio in the classroom received from a pulpit of the chapel. An echo effect may be heard when latencies to the chapel are not matched with those of the classroom. The system 600 may query the AV devices over the network 120 to determine their latencies and whether or not they match for simultaneous arrival of AV signals to receiving AV devices.

The system may measure path latencies throughout the AV system, set delay offsets in AV streams, and also map the networks paths from transmitting AV devices to receiving AV devices. This information may be stored in a database along with appropriate logic such as, for example, all microphone inputs to processors and/or mixers may be used to normalize or match the latencies on inputs but are then excluded for output measurement. The logic may also direct the system to match latencies within an output zone or with regards to zone-to-zone variation. Additionally, physical locations may automatically dictate insertion of extra time delays into the AV stream path, for instance under a balcony zone in a concert hall. If the network latency is due to network topology, however, then those extra time delays may be subtracted out of the AV stream path.

Accordingly, given the existence of such multiple simultaneous AV data path latencies, the latency optimizer 532 may automatically: (1) match a network latency of the receiving AV devices that serve an output zone such that signal data paths to each receiving AV device associated with the output zone has the same network latency; and (2) match a network latency of the receiving AV devices and a corresponding network path that serve two or more output zones, such that signal data paths for the logically-associated AV devices for each output zone acquire a network latency of a worst-case (or maximum) latency from among all complete data paths to the receiving AV devices in any of the two or more output zones. For instance, matching a network latency may be executed through control of one or more network devices of the network 120 by the system 600, to slow down the signal data path for logically-associated AV devices where needed for matching. Examples of such network devices include, but are not limited to, routers, switches, hubs, and other packet-processing equipment on the network 120. In other words, the system may automatically measure associated end-to-end path latencies through intermediate network devices of all complete data paths and then set an offset delay of a plurality of AV devices to match the maximum path latency in any other signal path.

Networked AV Paging

The graphical representation of the physical layout of a venue lends itself well to a control interface for paging. The system generation may handle both dedicated networked AV paging microphones and analog inputs on DSP devices.

More specifically, the output zone networked AV router 528 may also feed the paging configurator 528 so that the latter knows what destination devices are associated with what output zones and which source AV signal is being routed to that output zone. Tracking these associations, the venue designer 504 may enable a user to set up a public service and/or paging output zone that includes a plurality of rooms, or an entire building of a venue. The rooms put together as the public service or paging output zones may be public spaces where employees and/or visitors may be located. The paging configurator 528 may be executed by a system user when needed such as for paging an employee or for public service announcements such as for evacuation. When a specific output zone is paged or activated for a public service announcement, the source AV signal(s) being routed to the rooms or spaces of the output zone will be temporarily interrupted while the page or public service announcement is played.

For instance, the paging configurator 524 may enable paging a message to one or more loudspeakers of a paging output zone from an AV device other than the one or more transmitting AV devices feeding an input signal to a currently-active output zone. The system 600 temporarily disrupts the input signal during paging and the paging message is automatically routed to the currently-active output zone. In one example, the AV device other than the one or more transmitting AV devices includes a public announcement audio source, whether a live or a pre-recorded announcement. A live announcement may be executed through a microphone associated with a paging output zone. A pre-recorded announcement may be executed through an audio player associated with a public service output zone.

Execution of paging may be performed by loading a preset configuration as discussed previously with reference to routing presets. The system may receive the preset configuration, which in one example includes a snapshot of SVs and attributes defining routes for various networked AV devices, where the system automatically transitions to routing the message according to the preset once loaded by the user. The routing may transition to transmitting the source AV signal to a second output zone that may include one or more output zones that were previously receiving different source AV device signals.

Control Interfaces

The configuration system may provide factory-supplied control interfaces (or panels) to perform specific tasks for output zone control, which reduce the need for custom control interface design by the user. Configuration of such control interfaces may rely on the understanding of how AV devices are logically grouped according to output zones or may be achieved by way of additional software configuration wizards. For example, a mixer panel may be designed in this manner to be left behind for a day-to-day operator to be able to adjust inputs, outputs, gain, and mute for instance. An example of the mixer panel is depicted in FIG. 15.

With the system able to interpret the design based on rooms and zones configuration, with a few quick questions, the system designer could easily configure channel strips to represent zone/room source, output level, mute, solo, and processing.

Representing output zone processing as inserted effects within a channel strip may also offer the ability to add signal processing to each channel strip, continuing the paradigm of abstracting processing from the device. The system may also perform latency optimization when adding signal processing in this manner as discussed earlier.

Having designed the physical layout of a system by room, there is great benefit in leaving behind the planogram of the building as a control interface, either for direct control of sources, and output zone combining or for launching daughter interfaces for rooms, zones, or AV devices, which will be discussed in more detail later.

Although output zones may be provided with pre-determined control interfaces, which may aim to cover as many suitable scenarios as possible, there may also be the need for system designers to associate customized interfaces (or panels) with each of these areas. The workflow may be to create interfaces, then assign to output zones or rooms, racks, and the like.

Automatic Generation of Control Interfaces

Operation of the Venue View may enable control interfaces to be launched directly from output zones. In one example, the configuration system may distinguish between design modes and operational modes, in which the design mode may be executed offline and the operational mode may be executed online, over the network 120. In a different example, there may be no visual distinction between design modes and operational modes.

The configuration system generation may include control interfaces, pre-determined by real-world operational function. Knowing more about the system design, factory-supplied interfaces designed by system design function may be provided, where the system assigns the relevant parameters automatically so the processing is abstracted from the system designer and the process of creating Master or Custom Control Interfaces is automated.

Figure 13:
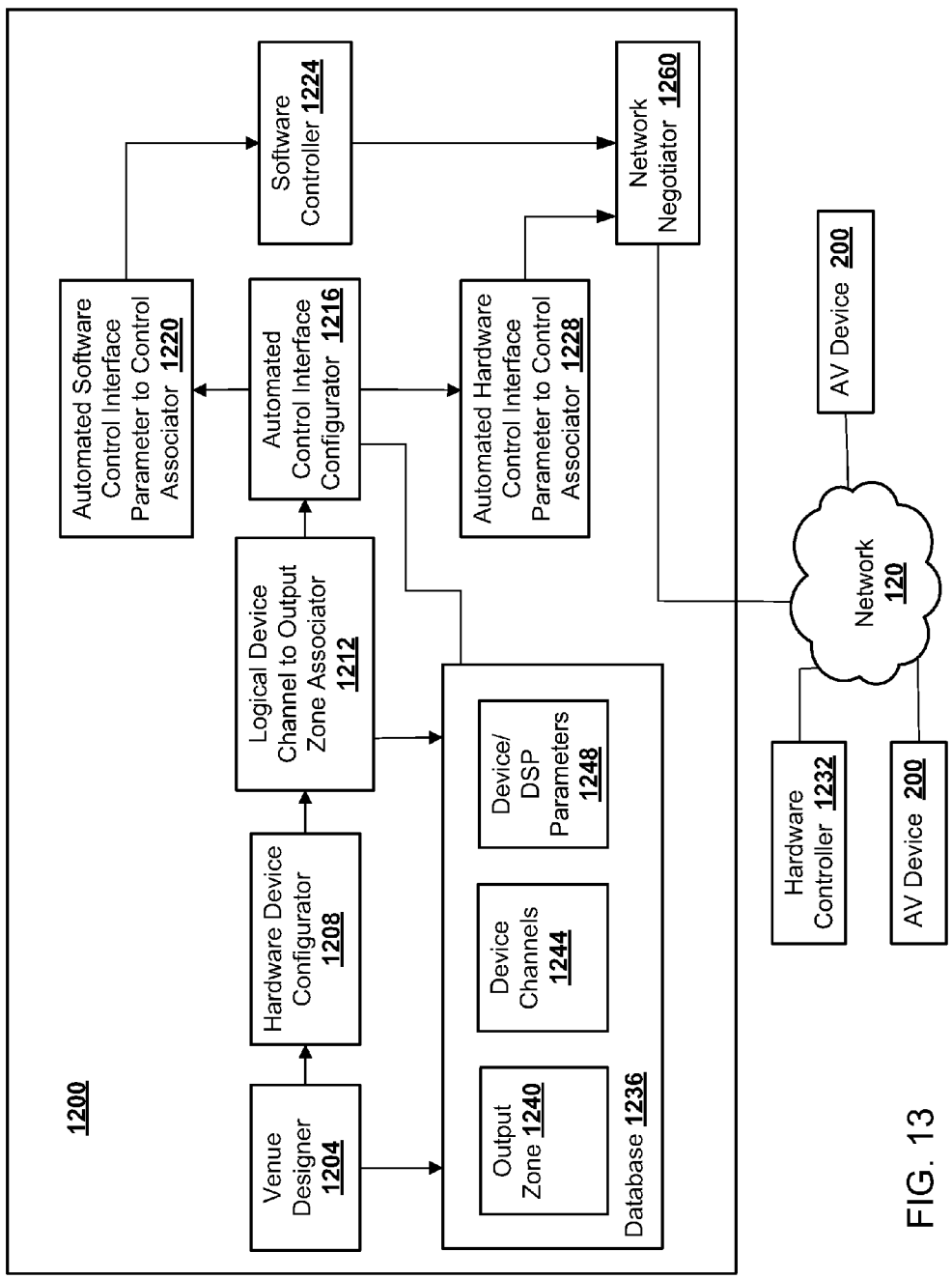
FIG. 13 is a block diagram of an example system for automating the assignment of AV device parameters to a control interface for remotely controlling corresponding AV-related devices of an output zone over a network.
Figure 14:
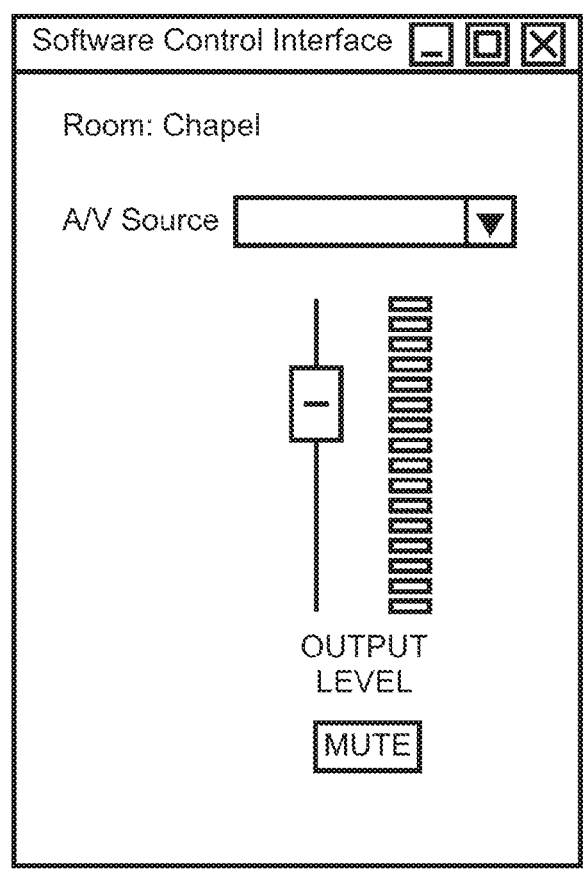
FIG. 14 is a screen shot of an example control interface automatically programmed according to the system of FIG. 12.

FIG. 13 is a block diagram of an example system 1200 for automating the assignment of AV device parameters to a control interface for remotely controlling corresponding AV-related devices 200 of an output zone over a network 120. Examples of functional control interfaces (or interfaces) that may be generated automatically by parameter assignment, either in software or hardware, may include those for: array tuning; output zone or room tuning; a wireless system panel; venue monitor mode for all output zones; and venue operation interfaces. Other examples are envisioned. The venue operation interfaces may include a venue view for navigation, monitoring, and output zone combining. The venue operation interfaces may be automatically generated for room or output zone source, level, mute, and the like, as shown in FIG. 14 that may control a group of AV devices.

The system 1200 may include, but is not limited to, a venue designer 1204, a hardware device configurator 1208, a logical device channel to output zone associator 1212, an automated control interface configurator 1216, an automated software control interface parameter to control associator 1220, a software controller 1224, an automated hardware control interface parameter to control associator 1228, and a hardware controller 1232 coupled with the network 120.

The system 1200 may further include a database 1236 that includes output zones 1240, device channels 1244 of AV devices of a configured AV system, and device DSP parameters 1248 stored in relation to each other where applicable. The system 1200 may also include a network negotiator 1260 to interface with and facilitate communication over the network 120 to couple components of the system 1200 with the AV devices 200 over the network 120. These enumerated components of the system 1200 may include functionality provided by integration with or execution through the configuration system discussed herein or any combination of software and hardware as will be discussed in more detail later.

As with the system 600, the system 1200 may also enable a user to pictorially configure an AV system with a user interface or GUI of a computing device on which are executed instructions for networked configuration of the AV system. The venue designer 1204 may enable the user to draw a plurality of output zones 1240 to create a representation of the geographical layout of a venue in which the AV system is located. The hardware device configurator 1208 may enable the user to place a plurality of AV devices 200 within the output zones of the geographical layout that substantially represent physical locations thereof within the venue. Finally, a logical device channel to output zone associator 1212 may enable the user to logically associate one or more AV device channels of one or more AV devices 200 with an output zone.

The automated control interface configurator 1216 may then automatically configure a control interface for user control of controllable parameters of the associated one or more AV devices. In one example, the automated control interface configurator 1216 may operate in an offline or design mode and thus determine the controllable parameters of an AV device by looking them up in a pre-existing table, for instance by querying the database 1236 in memory. The database 1236 may contain the controllable device parameters for the specific AV devices, and may return a BLOCK data storage structure (or other messaging storage structure) related thereto as associated with the queried-for AV devices. In another example, the automated control interface configurator 1216 may operate online in an operational mode and thus determine the controllable parameters by querying the one or more AV devices 200 over the network 120, and receiving the data storage structure directly from the AV devices for the controllable parameters. As discussed earlier, the data storage structure may store any sort of data required for defining SVs and other route-related parameters as BLOCK/STRING (or data) values. When received by an AV device, the data structure may be parsed and its data values assigned to corresponding parameters or SVs in the AV device. As discussed, the SVs may then announce over the network to any subscribers that the SVs have changed.

The automated software or hardware control interface parameter to control associator 1220 and 1228 may then automatically assign parameters of the output zone-associated one or more AV devices to a control interface for user control thereof by assigning the data storage structure associated with each respective parameter to the control interface. The automated software control interface parameter to control associator 1220 performs this step if what the user wants to create is a software controller 1224 and the automated hardware control interface parameter to control associator 1228 performs this step if what the user wants to create is a hardware controller 1232. The automated control interface configurator 1216 may launch the control interface in an application window having integrated therewith the controllable parameters and a menu selection of a source AV signal by which the control interface enables the user may select a desired source AV signal to route to the output zone.

The system 1200 may then receive a user selection of source AV signal(s), and send the assignment of each data storage structure and associated parameters to each respective, corresponding AV device over the network 120 to thereby remotely control the one or more AV devices with the control interface, which may be operated by the user. In some examples, control of certain parameters does not require the selection of a source AV signal by a user before the data storage structure is sent to corresponding AV devices over the network 120. For instance, the controllable parameter could be for volume control, which may enable volume control of a local, analog source signal, and therefore not require a separate source AV signal be routed to the device over the network 120.

In the case of automatic assignment of controllable parameters to a hardware controller coupled with the network, the launching of the control interface in the application window may not be necessary, or the application window may still be launched on the hardware controller. The hardware controller may include a list of preset configurations for parameters and routings, which the system may select depending on the receiving AV device channels associated with the output zone and the selected source AV signal.

The software controller 1224 may include software controls instantiated within the computing device of the system 1200. If what is generated is the hardware controller 1232, the system 1200 may send the assigned parameters and the corresponding data storage structures over the network 120 to the corresponding AV device(s) with the help of the network negotiators 1260 as discussed previously. In the alternative, the system 1200 may choose a preset available within the hardware controller that provides control of the assigned parameters, as just discussed. The hardware controller 1232 may be located in a physical location, such as in an output zone of a building or other venue, and may include programmable user controls on a touch screen interface that become activated to the correct parameters after receiving the associated control protocol strings. One example of hardware controller 1232 includes a wall controller located in an output zone. Other programmable user controls are envisioned, such as faders, dials, etc., and thus these are merely examples. In the below examples, hardware control interfaces may be substituted for software control interfaces.

FIG. 14 is a screen shot of an example control interface automatically programmed according to the system of FIG. 13. In this example, one or more output zones of the Chapel are now controllable from the software control interface displayed. The AV source is shown as having the output volume level and a mute button. A slider is provided to allow a user to control the output volume level.

FIG. 15 is a screen shot of an example system mixer panel automatically programmed according to the system of FIG. 13 for a plurality of output zones. While the mixer panel shown in FIG. 15 was referred to earlier in the context of a user being able to configure it, the mixer panel may also be generated automatically as described with reference to FIG. 13. The mixer panel of FIG. 15 may be a control interface that includes a plurality of AV sources, for each of at least some of the output zones created by the user. In this example, those output zones include: a Chapel, a Meeting Room, a Youth Classroom, a Classroom, an Office, and a vestry. Output Levels of volume along with basic sliders and mute selectors are also displayed for user control of the output levels.

The output zones to which were added DSP components include an indication of what type of DSP component, along with a selection button to view the output of the DSP component. For instance, as shown in FIG. 16, if a user were to select the "DSP type f" of the Meeting Room output zone in FIG. 15, a separate screen may be executed as a pop up window that displays the output of the DSP component f. The output of the DSP component could also be displayed within the same window or in a different tab of a browser, which may be employed in conjunction with a software control interface.

Figure 17:
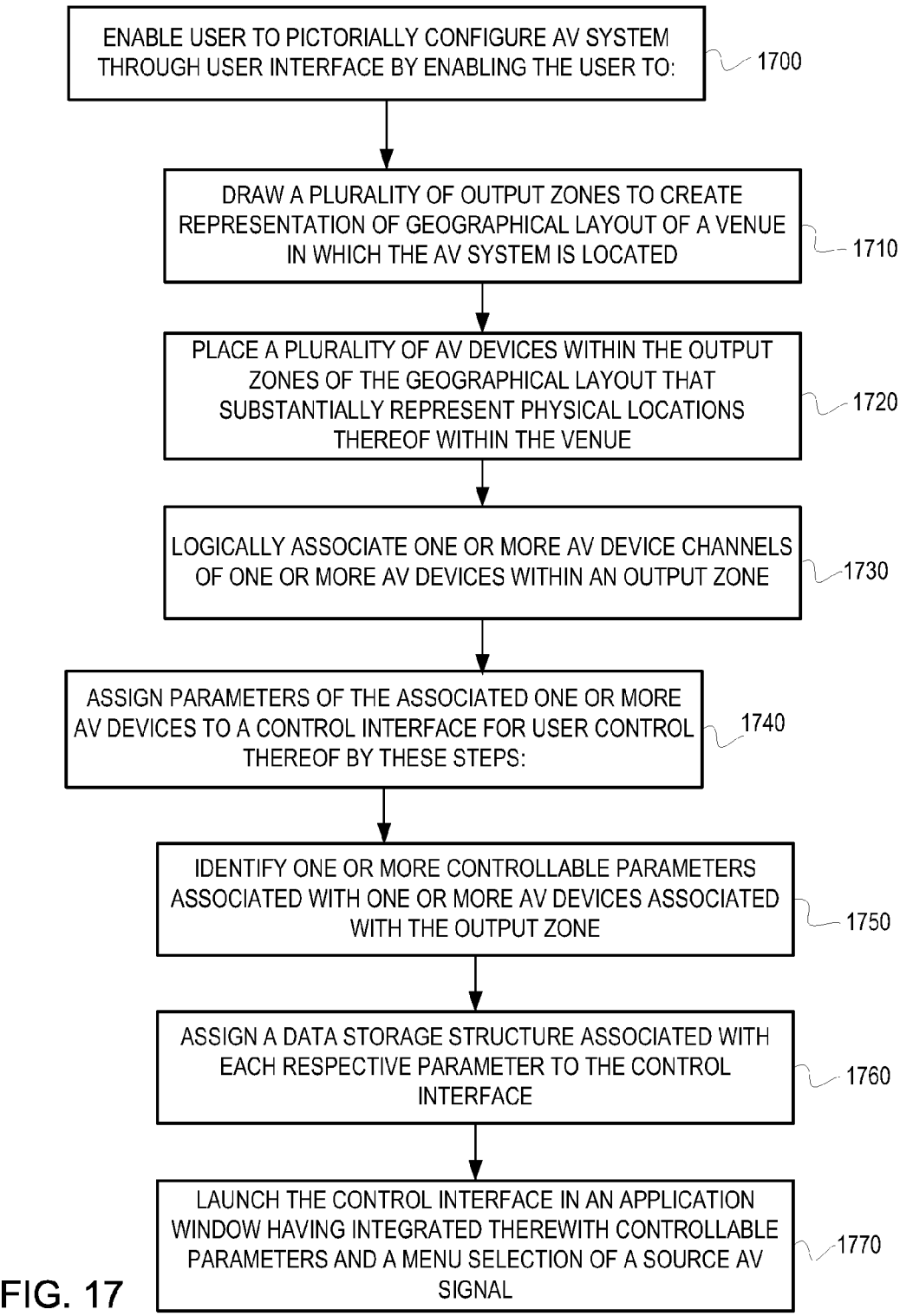
FIG. 17 is a flow chart of an example method for automating the assignment of AV device parameters to a control interface for remotely controlling corresponding AV-related devices of an output zone over a network.

FIG. 17 is a flow chart of an example method for automating the assignment of AV device parameters to a control interface for remotely controlling corresponding AV-related devices of an output zone over a network. The example method is executable on a computing device having a processor and memory. At block 1700, the computing device enables a user, with a user interface, to pictorially configure the AV system by enabling the user to do the steps at blocks 1710 through 1730. At block 1710, the user is enabled to draw a plurality of output zones to create a representation of the geographical layout of a venue in which the AV system is located. At block 1720, the user is enabled to place a plurality of AV devices within the output zones of the geographical layout that substantially represent physical locations thereof within the venue. At block 1730, the user is enabled to logically associate one or more AV device channels of one or more AV devices with an output zone.

At block 1740, after completion of the steps at blocks 1710 through 1730, the computing device automatically assigns parameters of the associated one or more AV devices to a control interface for user control thereof by executing the steps at blocks 1750 through 1770. At block 1750, the computing device identifies one or more controllable parameters associated with the one or more AV devices associated with the output zone. At block 1760, the computing device assigns a data storage structure associated with each respective parameter to the control interface. And, at block 1770, the computing device launches the control interface in an application window having integrated therewith the controllable parameters and a menu selection of a source AV signal. As a further step (now shown), the computing device may send the assigned data storage structure for the one or more controllable parameters to corresponding AV devices over a network to thereby remotely control the one or more AV devices with the control interface.

Figure 18:
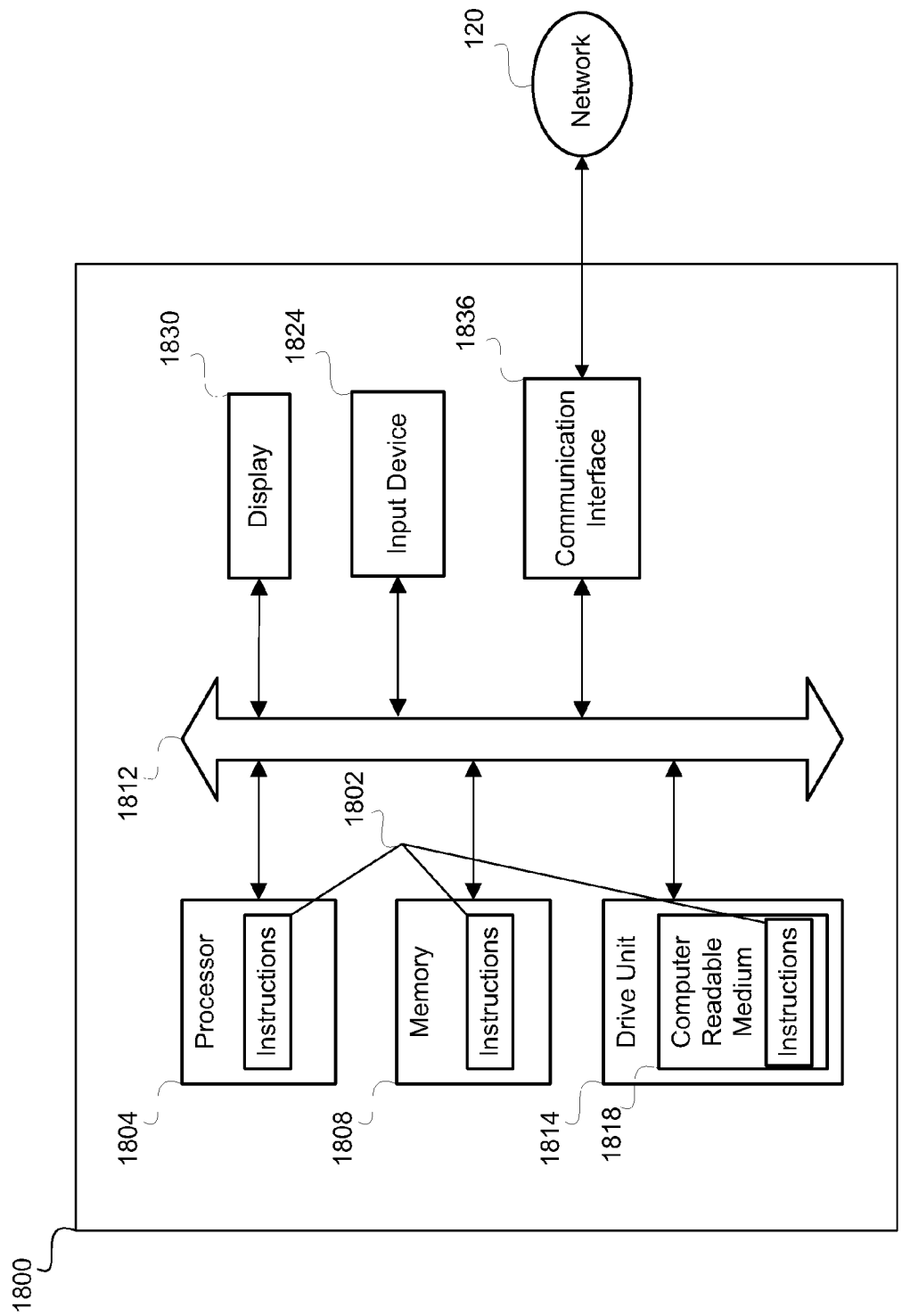
FIG. 18 is a general computer system, which may represent any of the computing or AV devices referenced herein.

FIG. 18 illustrates a general computer system 1800, which may represent the performance equipment manager 150, 152, 154, and 328, an audio-video (AV) device 200, the system 600 or the system 1800 that may be a integrated part of a PEM, or any other computing devices referenced herein, such as to generate a graphical user interface (GUI) for pictorial configuration of an AV system by the user. The computer system 1800 may include an ordered listing of a set of instructions 1802 that may be executed to cause the computer system 1800 to perform any one or more of the methods or computer-based functions disclosed herein. The computer system 1800 may operate as a stand-alone device or may be connected, e.g., using the network 120, to other computer systems or peripheral devices.

In a networked deployment, the computer system 1800 may operate in the capacity of a server or as a client-user computer in a server-client user network environment, or as a peer computer system in a peer-to-peer (or distributed) network environment. The computer system 1800 may also be implemented as or incorporated into various devices, such as a personal computer or a mobile computing device capable of executing a set of instructions 1802 that specify actions to be taken by that machine, including and not limited to, accessing the network 120 through any form of browser. Further, each of the systems described may include any collection of subsystems that individually or jointly execute a set, or multiple sets, of instructions to perform one or more computer functions.

The computer system 1800 may include a processor 1804, such as a central processing unit (CPU) and/or a graphics processing unit (GPU). The processor 1804 may include one or more general processors, digital signal processors, application specific integrated circuits, field programmable gate arrays, digital circuits, optical circuits, analog circuits, combinations thereof, or other now known or later-developed devices for analyzing and processing data. The processor 1804 may implement the set of instructions 1802 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing or networked communication.

The computer system 1800 may include a memory 1808 on a bus 1812 for communicating information. Code operable to cause the computer system to perform any of the acts or operations described herein may be stored in the memory 1808. The memory 1808 may be a random-access memory, read-only memory, programmable memory, hard disk drive or any other type of volatile or non-volatile memory or storage device.

The computer system 1800 may also include a disk or optical drive unit 1814. The disk drive unit 1814 may include a computer-readable medium 1818 in which one or more sets of instructions 1802, e.g., software, can be embedded. Further, the instructions 1802 may perform one or more of the operations as described herein. The instructions 1802 may reside completely, or at least partially, within the memory 1808 and/or within the processor 1804 during execution by the computer system 1800. Accordingly, the databases 426, 428, 430, 432, 536, and 1236 described above may be stored in the memory 1808 and/or the disk unit 1814.

The memory 1808 and the processor 1804 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1800 may include an input device 1824, such as a keyboard or mouse, configured for a user to interact with any of the components of system 1800, including user selections or menu entries of display menus. It may further include a display 1830, such as a liquid crystal display (LCD), a cathode ray tube (CRT), or any other display suitable for conveying information. The display 1830 may act as an interface for the user to see the functioning of the processor 1804, or specifically as an interface with the software stored in the memory 1808 or the drive unit 1814.

The computer system 1800 may include a communication interface 1836 that enables communications via the communications network 120, which may include or be function similarly to the network negotiators 560, 1260. The network 120 may include wired networks, wireless networks, or combinations thereof. The communication interface 1836 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 1804. Software modules may include instructions stored in the memory 1808, or other memory device, that are executable by the processor 1804 or other processors. Hardware modules may include various devices, components, circuits, gates, circuit boards, and the like that are executable, directed, and/or controlled for performance by the processor 1804.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of configuring an audio/video (AV) system, the method executable on a computing device having a processor and memory, the method comprising:

enabling a user, with a user interface of the computing device on which are executed instructions for configuration of the AV system, to configure the AV system by enabling the user to:
  draw a plurality of output zones to create a representation of a geographical layout of a venue in which the AV system is located, each output zone being included in a database, the database storing parameters associated with each output zone in relation to that output zone;
  place a plurality of transmitting and receiving AV devices within the output zones of the geographical layout that substantially represent physical locations thereof within the venue, where the plurality of receiving AV devices are selected from the group consisting of an audio amplifier, a loudspeaker, a digital signal processing (DSP) device, and an off-ramp AV device;
  logically associate one or more receiving AV device channels of one or more receiving AV devices within respective output zones; and
  select which of a plurality of source AV signals from transmitting AV devices the user wants to route to the respective associated output zones;
responsive to the user configuring the AV system with the user interface, the computing device automatically, for each of the plurality of output zones configured by the user, assigning relevant parameters for that output zone to the one or more transmitting and receiving AV devices placed in that output zone by the user based on a relationship of the relevant parameters to that output zone as stored in the database, and automatically negotiating settings for the one or more receiving AV devices within that output zone, the settings including latency and at least one of channel count, bit depth, and sample frequency, where automatically negotiating the settings comprises, for each of the plurality of output zones configured by the user, routing the source AV signals from one or more transmitting AV devices over a network to the one or more receiving AV device channels associated with that output zone, such that the one or more receiving AV device channels are processed according to respective output zones as configured by the user;
measuring latencies of signal data paths through the network between the transmitting and receiving AV devices of at least two output zones, including latencies caused by intermediate routing devices within the network;
mapping the signal data paths between the transmitting and receiving AV devices; and
matching a latency of the receiving AV devices and corresponding respective signal data paths that serve the two or more output zones, such that signal data paths for the logically-associated receiving AV device channels for each of the at least two output zones acquires a network latency of a maximum path latency from among all complete signal data paths to the receiving AV devices.

2. The method of claim 1, where the logical association of the one or more receiving AV device channels replicates a physical relationship of at least some of the receiving AV devices with loudspeakers in respective output zones.

3. The method of claim 1, further comprising the computing device:
  controlling the one or more transmitting AV devices in response to a grouped association of the one or more receiving AV devices according to output zone, to thereby route the source AV signals to the one or more receiving AV devices.

4. The method of claim 1, where the plurality of transmitting AV devices are selected from the group consisting of a microphone, an audio digital signal processing (DSP) device, and an on-ramp AV device, further comprising the computing device:
  enabling the user, through the user interface, to pictorially remove one or more DSP devices from a location in-line with an identified receiving AV device, which dissociates the DSP device from a corresponding output zone;
  where, in response to removal of the one or more DSP devices, the computing device dynamically re-routing at least one of the source AV signals to bypass the removed one or more DSP devices before or after receipt by the identified receiving AV device, to remove selected signal processing capabilities from the at least one of the source AV signals.

5. The method of claim 1, where the one or more receiving AV devices of respective output zones comprises one or more loudspeakers, the method further comprising the computing device:
  enabling paging a message to the one or more loudspeakers from an AV device other than the one or more transmitting AV devices, where the source AV signal is temporarily disrupted during paging and the paging message is routed to at least a first output zone.

6. The method of claim 5, where the computing device receives a preset for routing the message from the other AV device to a second output zone that includes the first output zone, where the other AV device comprises a public announcement audio source selected from the group consisting of a live announcement and a pre-recorded announcement.

7. The method of claim 1, where the one or more receiving AV device channels comprise audio device channels, the method further comprising the computing device:
  enabling the user to combine output zones for simultaneous control by:
    enabling the user to select two or more output zones to combine through the user interface;
    logically grouping, by the computing device over the network, control of two or more receiving AV devices logically associated with the selected two or more output zones such that they will be controlled as a group; and
    enabling the user to control as a group the audio device channels of the receiving AV devices logically associated with the two or more output zones through the user interface of the computing device.

8. The method of claim 7, where for the two or more receiving AV devices, at least one each corresponding to each output zone, the computing device linking AV routing of one or more receiving source AV signal input sources.

9. The method of claim 7, further comprising the computing device:
  enabling the user to separate the two or more output zones through the user interface to reverse the simultaneous control of the two or more output zones; and
  segregating, by the computing device, the audio device channels of the two or more receiving AV devices such that they will be controlled separately over the network, thereby also segregating the AV routing of one or more receiving source AV signal input sources.

10. The method of claim 7, where the computing device determines which of the two or more output zones is a control master and which is a control slave by determining master and slave relationships among the logically-associated receiving AV devices of the two or more output zones.

11. The method of claim 1, where matching the latencies comprises the computing device:
controlling one or more intermediate network devices of the network to slow down at least one of the signal data paths to one of the at least two output zones.

12. The method of claim 1, where matching a network latency comprises the computing device:
setting an offset delay of a plurality of AV devices such that the latency of a signal data path matches the maximum path latency in any other signal data path.

13. The method of claim 1, further comprising:
enabling a user to place, pictorially within the user interface, a DSP device, where desired, at a location in-line with an identified receiving AV device, to associate the DSP device with the identified receiving AV device in one of the output zones;
where in response to the addition of the DSP device, the computing device dynamically re-routing at least one of the source AV signals through the DSP device before or after receipt by the identified receiving AV device, to add selected digital signal processing capability to the at least one of the source AV signals.

14. The method of claim 13, where the DSP device comprises a freely-configurable DSP device capable of being configured to replicate one or more processing components, where in response to addition of a processing component to the output zone by the user, the method further comprising the computing device:
configuring the DSP device with one or more elements to form the processing component, and re-routing the at least one of the source AV signals through the processing component before being fed to the identified receiving AV device.

15. In a computer system having a processor configured to generate a graphical user interface that receives a pictorial audio/video (AV) configuration screen on a display, a method of providing and selecting from a set of menus on the display, the method comprising:
retrieving a set of menu entries for each menu with the processor, each of the menu entries representing a step in pictorial configuration by a user of an AV system, where the set of menu entries include a venue designer, a hardware device configurator, an output zone associator, and a networked AV router;
displaying the set of menus on the display;
receiving a menu selection signal indicative of a user selection of a menu from the set of menus,
where in response to selection of the venue designer, the processor providing menu entries on the display that are selectable by the user to direct the processor to form a plurality of output zones and to create a representation of a geographical layout of a venue in which the AV system is located;
where in response to selection of the hardware device configurator, the processor providing menu entries on the display that are selectable by the user to direct the processor to place a plurality of transmitting and receiving AV devices within the output zones of the geographical layout that substantially represent physical locations thereof within the venue, where the plurality of receiving AV devices are selected from the group consisting of an audio amplifier, a loud speaker, a DSP device, and an off-ramp AV device;
where in response to selection of the output zone associator, the processor providing menu entries on the display that are selectable by the user to direct the processor to logically associate one or more receiving AV device channels of one or more receiving AV devices within respective output zones, each output zone being included in a database, the database storing parameters associated with each output zone in relation to that output zone;
where in response to selection of the networked AV router, the processor providing menu entries on the display that are selectable by the user to direct the processor to select which of a plurality of source AV signals the user wants to route to the respective associated output zones;
responsive to selection of one or more of the menu entries that are provided on the display in response to selection of the output zone associator, automatically assigning, for each output zone configured by the user, relevant parameters for that output zone to the one or more transmitting and receiving AV devices placed in that output zone by the user based on a relationship of the relevant parameters to that output zone as stored in the database, and automatically negotiating, by the processor and for each of the plurality of output zones configured by the user, settings including latency and at least one of channel count, bit depth, and sample frequency for the one or more receiving AV devices of that output zone by routing, by the processor, the source AV signals from one or more transmitting AV devices in that output zone over a network to the one or more receiving AV device channels associated with that output zone and automatically measuring end-to-end path latencies, such that the one or more receiving AV device channels are processed according to the respective output zones as configured by the user and automatic negotiation of latency is performed based on a configuration of the AV system by the user in the graphical user interface;
measuring, by the processor, latencies of signal data paths through the network between the transmitting and receiving AV devices of at least two output zones, including latencies caused by intermediate routing devices within the network;
mapping, by the processor, the signal data paths between the transmitting and receiving AV devices; and
matching, by the processor, a latency of the receiving AV devices and corresponding respective signal data paths that serve the two or more output zones, such that signal data paths for the logically-associated receiving AV device channels for each of the at least two output zones acquires a network latency of a maximum path latency from among all complete signal data paths to the receiving AV devices.

16. The method of claim 15, further comprising:
storing in data storage of the computer system the one or more receiving AV device channels in relation to the output zone logically associated therewith; and
saving one or more transmitting AV device channels in relation to the associated output zone, the transmitting AV device channels configured to supply the source AV signals.

17. The method of claim 15, where the plurality of transmitting AV devices are selected from the group consisting of a microphone, an audio digital signal processing (DSP) device, and an on-ramp AV device;
where in response to selection of the DSP device configurator, the processor providing menu entries on the display that are selectable by the user to direct the processor to pictorially remove one or more of the DSP devices from a location in-line with the one or more receiving AV devices, which disassociates the one or more DSP devices from a corresponding output zone; and where, in response to removal of one or more DSP devices, the processor dynamically re-routing at least one of the source AV signals to bypass the removed one or more DSP devices before or after receipt by the receiving AV devices, to remove selected digital signal processing capabilities from the at least one source AV signals.

18. The method of claim 15, where the one or more receiving AV devices of respective output zones comprises one or more loudspeakers, the method further comprising the processor:

enabling paging a message to the one or more loudspeakers from an AV device other than the one or more transmitting AV devices, where the source AV signal is temporarily disrupted during paging and the paging message is routed to at least a first output zone.

19. The method of claim 15, where the one or more receiving AV device channels comprise audio device channels, and the set of menus further comprising an output zone combiner;

where in response to the selection of the output zone combiner, the processor providing menu entries on the display that are selectable by the user to direct the processor to combine output zones for simultaneous control of the audio device channels associated therewith;

where in response to selection of two or more output zones by the user, the processor:

logically grouping the control of two or more receiving AV devices logically associated with the selected two or more output zones such that they will be controlled as a group; and enabling the user to control as a group the audio device channels of the receiving AV devices logically associated with the two or more output zones through the display.

20. The method of claim 19, where for the two or more receiving AV devices, at least one each corresponding to each output zone, the processor linking the AV routing of one or more receiving source AV signal input sources.

21. The method of claim 19, where in response to selection of two or more combined output zones for segregation of the combined two or more output zones, the processor segregating the audio device channels of the two or more receiving AV devices such that they will be controlled separately over the network, thereby also segregating the AV routing of one or more receiving source AV signal input sources.

22. The method of claim 19, where the processor determining which of the two or more output zones is a control master and which is a control slave by determining master and slave relationships among the logically-associated receiving AV devices of the two or more output zones.

23. The method of claim 15, where matching the latencies comprises the processor:

controlling one or more intermediate network devices of the network to slow down at least one of the signal paths to one of the at least two output zones.

24. The method of claim 15, where matching a network latency comprises the processor:

setting an offset delay of a plurality of AV devices such that the latency of a single data path matches the maximum path latency in any other signal data path.

25. The method of claim 15, where the set of menu entries further includes a digital signal processing (DSP) device configurator, further comprising the processor:

responsive to selection of the DSP device configurator, providing menu entries on the display that are selectable by the user to direct the processor to pictorially add one or more DSP devices to be placed, where desired, in-line with the one or more receiving AV devices, to associate the one or more DSP devices with one of the output zones; and dynamically re-routing, responsive to the addition of the one or more DSP devices, at least one of the source AV signals through the one or more DSP devices before or after receipt by the one or more receiving AV devices, to add selected digital signal processing capabilities to the at least one of the source AV signals.

26. The method of claim 25, where the one or more DSP devices comprise freely-configurable DSP devices capable of being configured to replicate one or more processing components, where in response to addition of a processing component to the output zone by the user, the method further comprising:

configuring the DSP device with one or more elements to form the processing component, and re-routing the source AV signal through the processing component before being fed to the receiving AV device.

27. A non-transitory computer-readable storage medium comprising a set of instructions for configuring an audio/video (AV) system executable by a computing device having a processor and memory, the computer-readable medium comprising:

instructions to draw a plurality of output zones to create a representation of a geographical layout of a venue in which the AV system is located in response to signals representative of user inputs through a user interface to form the plurality of output zones, a database storing, for each output zone of the plurality of output zones, one or more parameters in relation to that output zone;

instructions to place a plurality of transmitting and receiving AV devices within the output zones of the geographical layout that substantially represent physical locations thereof in the venue in response to signals representative of user inputs through the user interface to insert the plurality of transmitting and receiving AV devices in the output zones, where the transmitting and receiving AV devices include digital signal processing (DSP) devices;

instructions to automatically load the parameters for each output zone according to the database into the one or more transmitting and receiving AV devices within that output zone responsive to placing the one or more transmitting and receiving AV devices within that output zone; and instructions to generate one or more control interfaces for the output zone based on the loaded parameters, one or more of the control interfaces being pre-determined by real-world operational function associated with the output zone, the control interfaces including interfaces for one or more of array tuning, output zone or room tuning, a wireless system panel, a venue monitor mode for all output zones, and a venue operation interface.

28. The computer-readable storage medium of claim 27, further comprising instructions to direct the processor to route the source AV device signals from one or more transmitting AV devices over a network to the one or more receiving AV device channels associated with the output zone, such that the one or more receiving AV device channels are processed according to the output zone as configured by the user responsive to signals representative of user inputs through the user interface to associate the one or more receiving AV devices channels within respective output zones;

instructions to direct the processor to measure latencies of signal data paths through the network between the transmitting and receiving AV devices of at least two output zones, including latencies caused by intermediate routing devices within the network;

instructions to direct the processor to map the signal data paths between the transmitting and receiving AV devices;

instructions to direct the processor to matching a latency of the receiving AV devices and corresponding respective signal data paths that serve the two or more output zones, such that the signal data paths for the logically-associated receiving AV device channels for each of the at least two output zones acquires a network latency of a maximum path latency from among all complete signal data paths to the receiving AV devices; and a set of instructions to direct a processor to control the one or more transmitting AV devices in response to the grouped association of the one or more receiving AV devices according to output zone, to thereby route the source AV device signals to the one or more receiving AV devices.

29. The computer-readable storage medium of claim 27, the computer-readable storage medium further comprising:

instructions to add one or more of the DSP devices to be placed in-line with the one or more receiving AV devices of one of the output zones in response to signals representative of user inputs through the user interface to associate the DSP devices with the one or more receiving AV devices of the output zone; and instructions to dynamically re-route at least one of the source AV device signals through the one or more DSP devices before or after receipt by the one or more receiving AV devices, to add selected digital signal processing capabilities to the at least one of the source AV device signals, in response to the user adding the one or more DSP devices.

30. The computer-readable storage medium of claim 29, where the DSP devices comprise freely-configurable DSP devices capable of being configured to replicate one or more processing components, where in response to the addition of a processing component to the output zone by the user, the computer-readable storage medium further comprising:

instructions to configure a DSP device with the one or more elements to form the processing component; and instructions to re-route the source AV signal through the processing component before being fed to the receiving AV device.

31. The computer-readable storage medium of claim 27, where the one or more receiving AV devices of respective output zones comprises one or more loudspeakers, the computer-readable storage medium further comprising:

instructions enabling paging a message to the one or more loudspeakers from an AV device other than the one or more transmitting AV devices, where the source AV signal is temporarily disrupted during paging and the paging message is routed to at least a first output zone.

32. The computer-readable storage medium of claim 31, where the processor receives a preset for routing the message from the other AV device to a second output zone that includes the first output zone, where the other AV device comprises a public announcement audio source selected from the group consisting of a live announcement and a pre-recorded announcement.

33. The computer readable storage medium of claim 27, where the one or more receiving AV device channels comprise audio device channels, the computer-readable storage medium further comprising:

instructions to combine output zones for simultaneous control by the user in response to signals representative of user inputs through the user interface to select two or more output zones;

instructions to logically group the control of two or more receiving AV devices logically associated with the selected two or more output zones such that they will be controlled as a group; and instructions to control as a group the audio device channels of the receiving AV devices logically associated with the two or more output zones through a control interface of the computing device in response to user inputs through the control interface to adjust one or more controllable parameters integrated with the control interface.

34. The computer-readable storage medium of claim 33, where for the two or more receiving AV devices, at least one each corresponding to each output zone, the computing device linking AV routing of one or more receiving source AV signal input sources.

35. The computer-readable storage medium of claim 33, the computer-readable medium further comprising:

instructions to separate the two or more output zones through the user interface to reverse the simultaneous control of the two or more output zones in response to user inputs through the user interface to deselect the two or more output zones; and instructions to segregate the audio device channels of the two or more receiving AV devices such that they will be controlled separately over the network, thereby also segregating the AV routing of one or more receiving source AV signal input sources.

36. The computer-readable storage medium of claim 27, where matching the latencies comprises:

instructions to direct the processor to control one or more intermediate network devices of the network to slow down at least one of the signal data paths to one of the at least two output zones.

37. The computer-readable storage medium of claim 27, further comprising:

instructions to direct the processor to set an offset delay of a plurality of AV devices such that the latency of a single data path matches the maximum path latency in any other signal data path.

38. The computer-readable storage medium of claim 27, further comprising:

instructions to remove one or more DSP devices from a location in-line with the one or more receiving AV devices of one of the output zones in response to signals representative of user inputs through the user interface to disassociate the one or more DSP devices from the one or more receiving AV devices of the output zone; and instructions to dynamically re-route at least one of the source AV device signals to bypass the removed one or more DSP devices before or after receipt by at least one of the receiving AV devices, to remove selected digital signal processing capabilities from the at least one of the source AV device signals, in response to removal by the user of the one or more DSP devices from the user interface.

* * * * *